(12) United States Patent
Staicut et al.

(10) Patent No.: US 9,418,378 B2
(45) Date of Patent: Aug. 16, 2016

(54) METHOD AND SYSTEM FOR TRYING OUT A PRODUCT IN RELATION TO A REAL WORLD ENVIRONMENT

(71) Applicant: Gilt Groupe, Inc., New York, NY (US)

(72) Inventors: Ioana Ruxandra Staicut, New York, NY (US); Jesse Boyes, Brooklyn, NY (US); Allison Ann Sall, Marietta, GA (US); Yonatan Feldman, Old Greenwich, CT (US)

(73) Assignee: Gilt Groupe, Inc., New York, NY (US)

( * ) Notice: Subject to any disclaimer, the term of this patent is extended or adjusted under 35 U.S.C. 154(b) by 0 days.

(21) Appl. No.: 13/833,718

(22) Filed: Mar. 15, 2013

(65) Prior Publication Data

US 2014/0279242 A1 Sep. 18, 2014

(51) Int. Cl.
*G06Q 30/00* (2012.01)
*G06Q 30/06* (2012.01)
*H04N 21/478* (2011.01)
*H04W 4/00* (2009.01)

(52) U.S. Cl.
CPC ........ *G06Q 30/0623* (2013.01); *G06Q 30/0643* (2013.01); *H04M 2250/52* (2013.01); *H04N 21/47815* (2013.01); *H04W 4/003* (2013.01)

(58) Field of Classification Search
CPC .............................................. H04N 21/47815
See application file for complete search history.

(56) References Cited

U.S. PATENT DOCUMENTS

| | | | |
|---|---|---|---|
| 5,983,201 A | 11/1999 | Fay | |
| 6,570,581 B1 * | 5/2003 | Smith | 345/632 |
| 6,901,379 B1 | 5/2005 | Balter et al. | |
| 7,016,824 B2 | 3/2006 | Waupotitsch et al. | |
| 7,133,839 B2 | 11/2006 | Inoue et al. | |
| 8,275,590 B2 | 9/2012 | Szymczyk et al. | |
| 8,708,494 B1 * | 4/2014 | Surkov et al. | 351/227 |
| 2001/0023413 A1 | 9/2001 | Fukuma et al. | |
| 2001/0034668 A1 * | 10/2001 | Whitworth | 705/27 |
| 2003/0090625 A1 | 5/2003 | Izumitani et al. | |
| 2003/0110099 A1 | 6/2003 | Trajkovic et al. | |
| 2008/0151092 A1 * | 6/2008 | Vilcovsky | 348/333.01 |
| 2008/0170130 A1 * | 7/2008 | Ollila | H04N 5/2252 348/211.99 |
| 2011/0040539 A1 | 2/2011 | Szymczyk et al. | |
| 2011/0119716 A1 * | 5/2011 | Coleman, Sr. | H04N 7/181 725/62 |
| 2012/0218177 A1 * | 8/2012 | Pang et al. | 345/156 |
| 2012/0218423 A1 | 8/2012 | Smith et al. | |
| 2013/0046637 A1 * | 2/2013 | Slutsky et al. | 705/14.66 |

OTHER PUBLICATIONS http://www.ditto.com, Apr. 29, 2012 [recovered from www.archive.org].*

* cited by examiner

*Primary Examiner* — William Allen
*Assistant Examiner* — Anand Loharikar
(74) *Attorney, Agent, or Firm* — Locke Lord LLP

(57) ABSTRACT

A method, system and computer program are provided to allow one or more users to try out one or more products. The method, system and computer program involve providing information on one or more products offered for sale under restricted conditions of time or quantity, obtaining a real image of an object, determining one or more features from the object image, determining a position to overlay a first product image on the object image based on the determined one or more features, overlaying the first product image on the object image based on the determined position to provide an overlaid image, and displaying the overlaid image. The first product image is an image of a product from the one or more products.

26 Claims, 32 Drawing Sheets

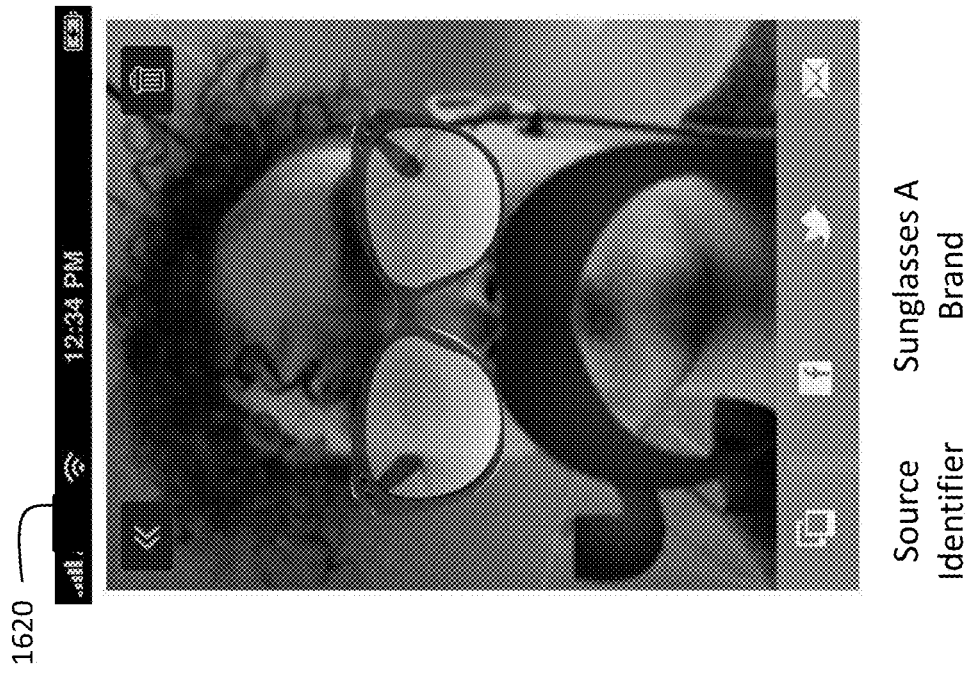

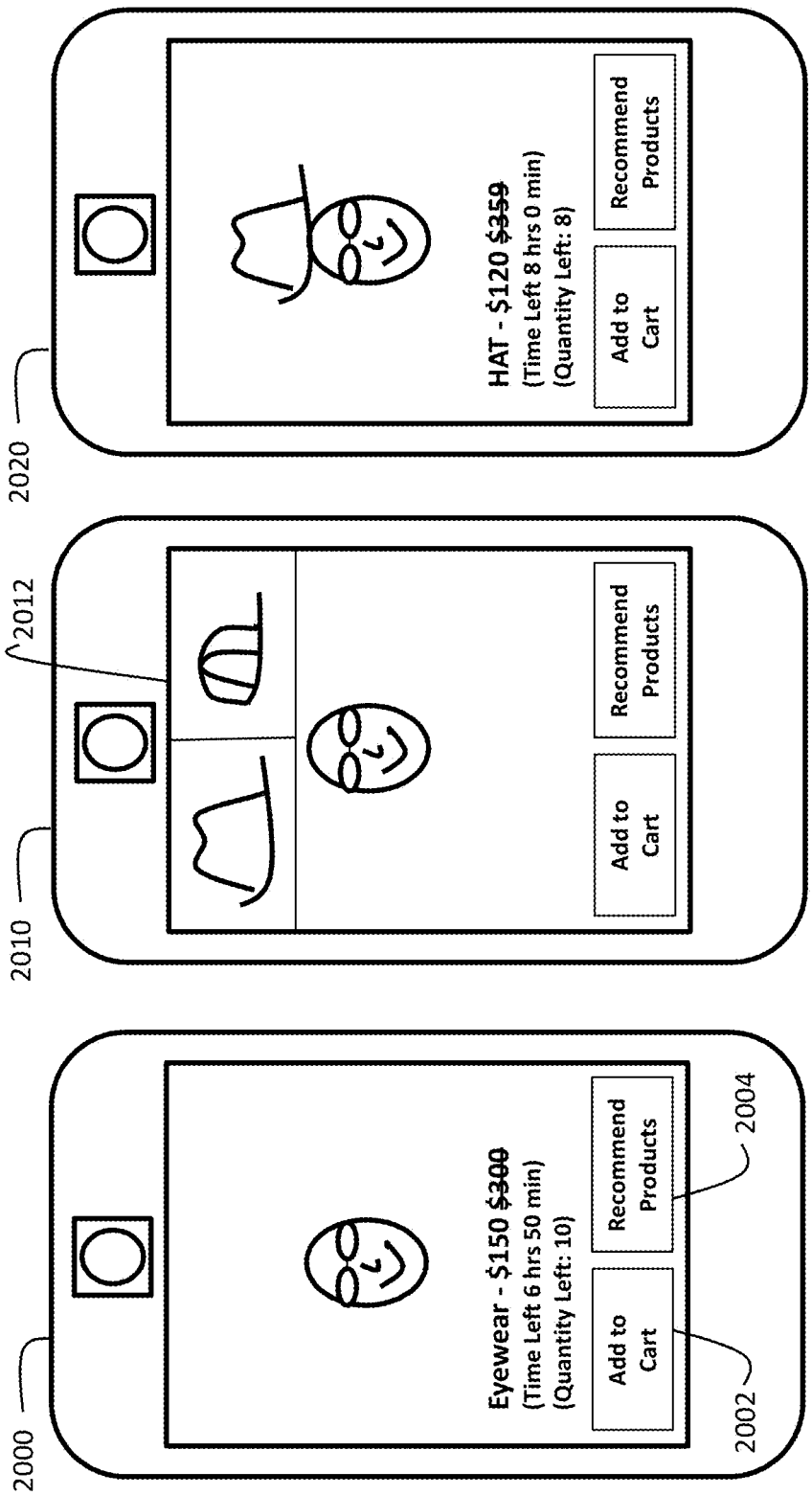

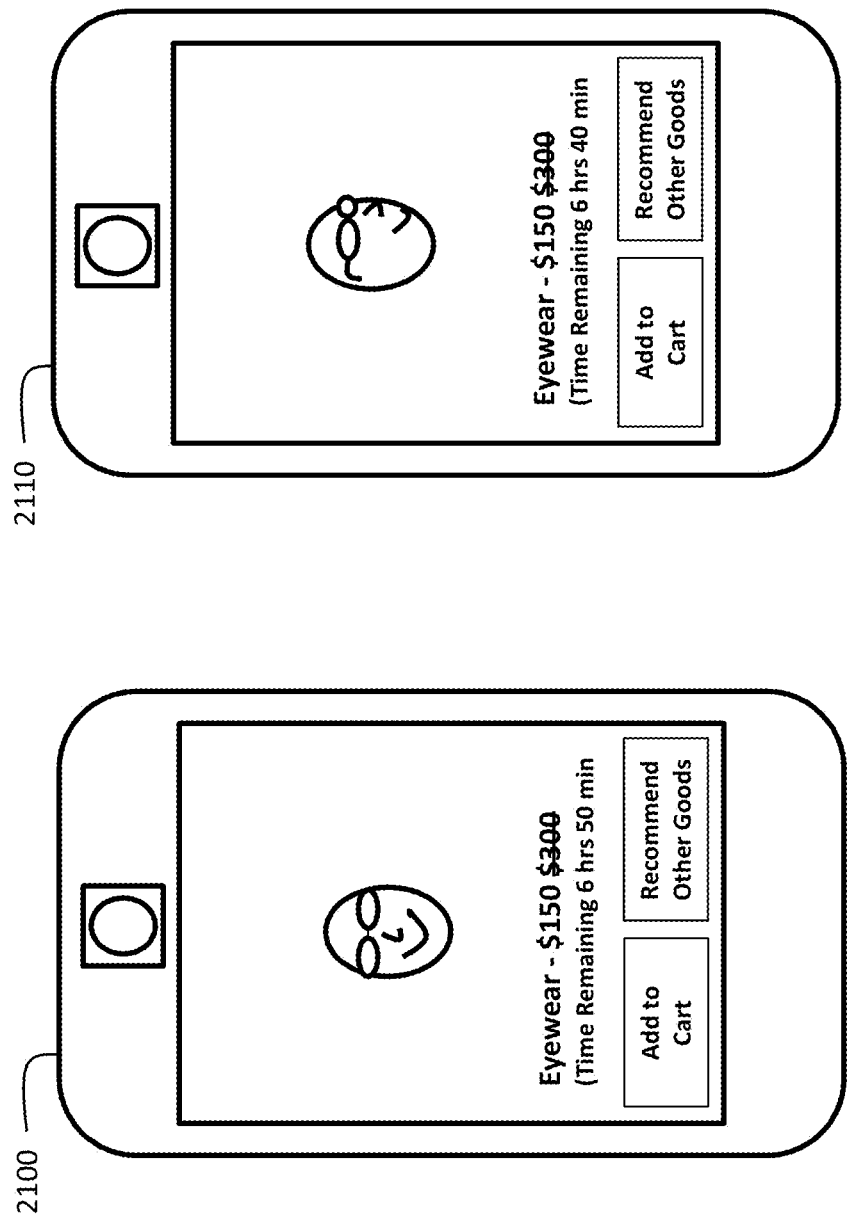

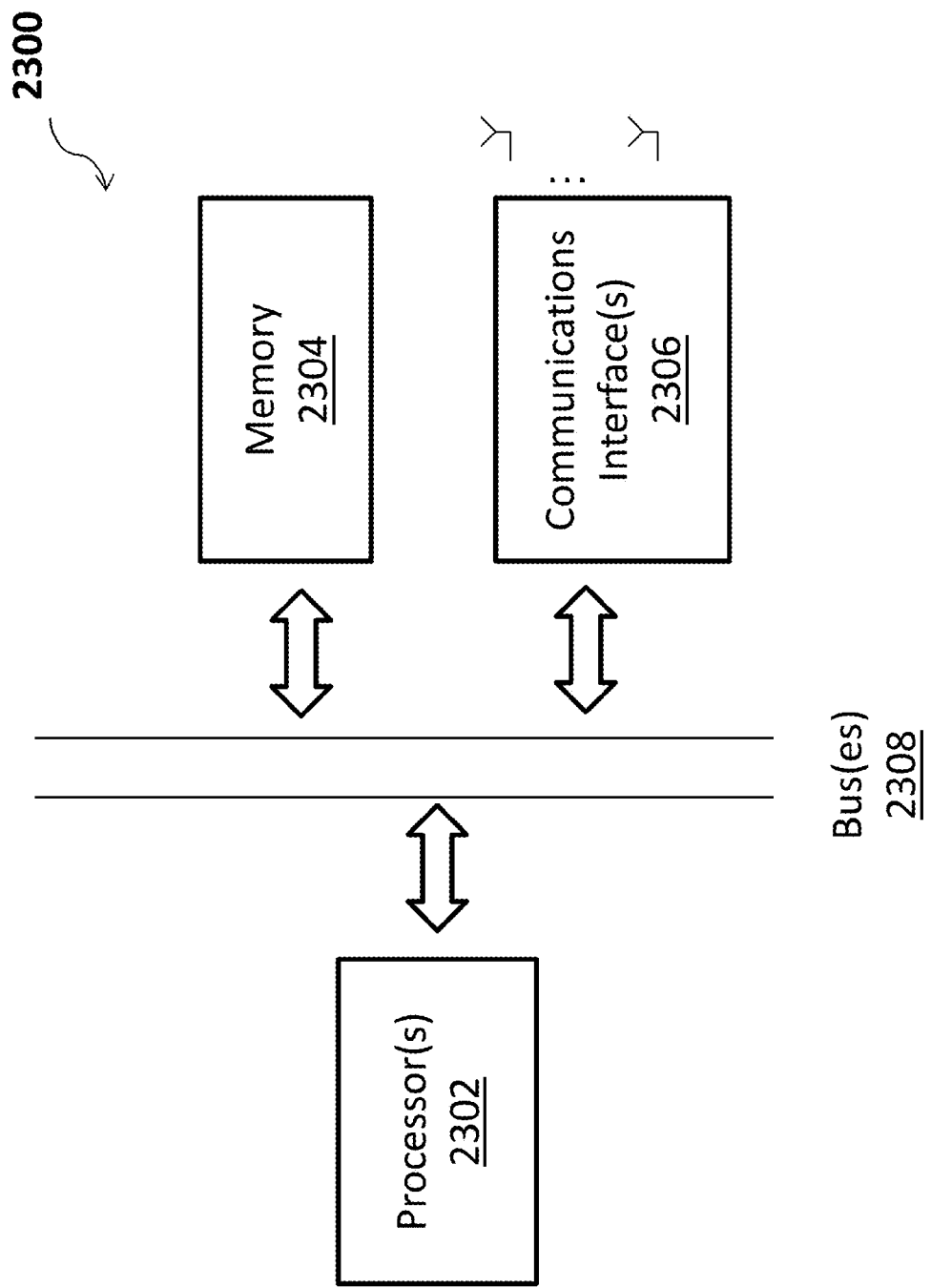

PRODUCT DATA
2600

Product A
- Category: Eyewear
  - Sub-Category: Sunglasses
- Image Data
  - Product Images (Viewpoints)
    - Images of Different Product Viewpoints
    - Metadata (e.g., File Metadata)
    - Image Capture Parameters
    - Tagged Information
- Product Detail
  - Product Identifier: Cool Sunglasses
  - Source (Brand/Designer): Brand A
  - Color(s): Red
  - Style:
  - Matching Products/Brands:
- Pricing Information:
  - Retail Price: $ XX.XX
  - Discount Price $AA.AA
  - Discount Percentage
  - Offer Conditions: (Restricted/Unrestricted)
    - Restricted: (YES/NO) - YES
      - Date/Time: March 1 2XXX, 12:00 pm to 2:00 pm
      - Quantity: 20
      - User Group: User Group B
- Other Product Information

[ . . . ]

Product ....ZZ

FIG. 26

METHOD AND SYSTEM FOR TRYING OUT A PRODUCT IN RELATION TO A REAL WORLD ENVIRONMENT

BACKGROUND

I. Field

The present disclosure relates to the field of image processing, and more particularly, to an approach for trying out (or trying on) a product in relation to a real world environment, such as through the use of augmented reality (AR) techniques.

II. Background

Every day, consumers purchase products, such as goods and/or services. When purchasing certain products, a consumer has traditionally shopped at brick and mortar stores (B&Ms) in order to try the products out or evaluate them in person before committing to a purchase. With advancements in technology, such as in the area of the Internet and mobile computing, many consumers are now attending to their shopping needs online through their mobile or portable devices. A whole online industry has arisen to capture this consumer market, including "deal" sites that offer products at a significant discount but often under restricted conditions, such as limitations as to time and/or quantity. As a consequence, the consumer often has little time to make an informed decision on whether or not to purchase a product that he or she has not tried out in person.

SUMMARY

In accordance with a disclosed embodiment of the present disclosure, a method, system and a computer program are provided to try out (or try on) one or more products, such as through a user device. The method, system and computer program involve providing information on one or more products offered for sale under restricted conditions of time or quantity, obtaining a real image of an object, determining one or more features from the object image, determining a position to overlay a first product image on the object image based on the determined one or more features, overlaying the first product image on the object image based on the determined position to provide an overlaid image, and displaying the overlaid image. The first product image is an image of a product from the one or more products. The operations can be implemented through a user device, such as a mobile device.

The overlaid image of the product image on the object image can be stored or forwarded to a destination, and can also be tagged with information including a product identifier and a product category of the product shown in the product image. A transaction can also be conducted by the user to purchase the product.

Furthermore, the object image can includes two or more objects, and the overlaying operation can overlay a first product image over a first of the two objects in the object image and another product image over at least a second of the two or more objects in the object image. The two or more objects in the object image can be two or more people.

In other embodiments, the method, system and computer program can further involve capturing live video frames of the object, in which the object image is a current frame from the captured video frames.

In another embodiment, the method, system and computer program can involve recommending one or more other products which are available for sale under restricted conditions of time or quantity based on at least one or more characteristics of the product whose product image is overlaid on the object image; and overlaying a second product image along with the first product image on the object image, the second product image including an image of the one or more recommended products. The characteristics of the product can include a brand name, a color, a size or a price of the product identified in the first product image.

In a further embodiment, the method, system and computer program can involve adjusting a position or size of the first product image as overlaid on the object image. A background of the determined one or more features in the object image can also be manipulated.

In yet another embodiment, the one or more products comprises a plurality of different products. The method, system and computer program further involve overlaying product images of at least two different products in a product listing separately on separate copies of the object image in response to a user input (or command); and displaying the at least two separate overlaid images at the same time. The user input can take the form of a shake gesture. Furthermore, the one or more products in the product listing have their product image overlaid on a separate copy of the object image and displayed together based on a strength or length of time of the shake gesture.

In another example, the object image is an image of a room, the product is a home good, and the first product image is an image of the home good. In yet another example, the object image is an image of a person, the product is eyewear and the first product image is an image of the eyewear.

In a further example, an overlay position can be determined by detecting boundaries of a facial feature of the person in the object image; finding a position of a left eye and a right eye of the person in the object image; calculating a slope between the left eye and the right eye in the object image; calculating an angle of rotation based on the slope between the left eye and the right eye in the object image; calculating coordinates of a middle point between the left eye and the right eye in the object image; determining a height and a width for the product image within the facial feature while maintaining aspect and ratio; adjusting the product image so that a width of the product image is proportional to the boundaries of the facial feature; obtaining a y-coordinate to overlay the product image depending on a position of the facial feature in the object image; and adjusting the y-coordinate to overlay the product image based on transparent pixels of the product image.

Furthermore, the product image can be overlaid at the determined position on the object image depending on if the determined position is within a threshold in comparison to a position previously determined for a prior object image. The object image is a currently captured video frame of the object and the prior object image is a prior captured video frame of the object. This approach can help to stabilize the product image being composited onto a real-time video feed (e.g., reduce jumpiness). The video frame rate can also be altered, e.g., slowed down or sped up, to accommodate processing time for feature detection and compositing or other operations that may need to be implemented.

In addition, the object image and associated positioning and orientation metadata can be stored for reuse with other product images. For example, a product image of a product in a different category from that of a product of the first product image is overlaid on the object image based on the stored object image and associated positioning and orientation metadata.

BRIEF DESCRIPTION OF THE DRAWINGS

The description of the various exemplary embodiments is explained in conjunction with the appended drawings, in which:

FIGS. 16A, 16B and 16C are screenshots of exemplary interfaces through which a user is provided with different options after trying out a product in accordance with various embodiments.

FIGS. 20A, 20B and 20C are screenshots of exemplary interfaces through which a user can try out other recommended products in accordance with various embodiments.

FIGS. 21A and 21B are screenshots of exemplary interfaces through which a user can try out a product at different viewpoints in accordance with various embodiments.

FIG. 23 is a block diagram of exemplary components of a server or computer system in accordance with an embodiment.

FIG. 26 is an exemplary product data for one or more products in accordance with an embodiment.

DETAILED DESCRIPTION

In accordance with various disclosed embodiments, there is provided a method, system and computer program for trying out or trying on (hereinafter "trying out" or "try out") products. In various exemplary embodiments, augmented reality (AR) techniques are employed in which a real world image is augmented, such as with other images including an image of a product ("product image"), to allow a consumer to try out products through a user device (or computer-based system) in order to make an informed decision before purchasing the product.

A product, as discussed herein, includes a good and/or service. For example, a good can include wearable items such as clothes, glasses, jewelry, watches, shoes and other accessories; home goods such as furniture, lamps, art work, window treatment, rugs and bedding; or an item that can be tried out in relation to a real world object. A service can include auto-detailing, tattooing, or other forms of alteration or modification of a real world object. The above-identified goods and services are simply provided as non-limiting examples.

An exemplary system environment, processes and databases are described below in further detail.

A. System Environment

Figure 1:
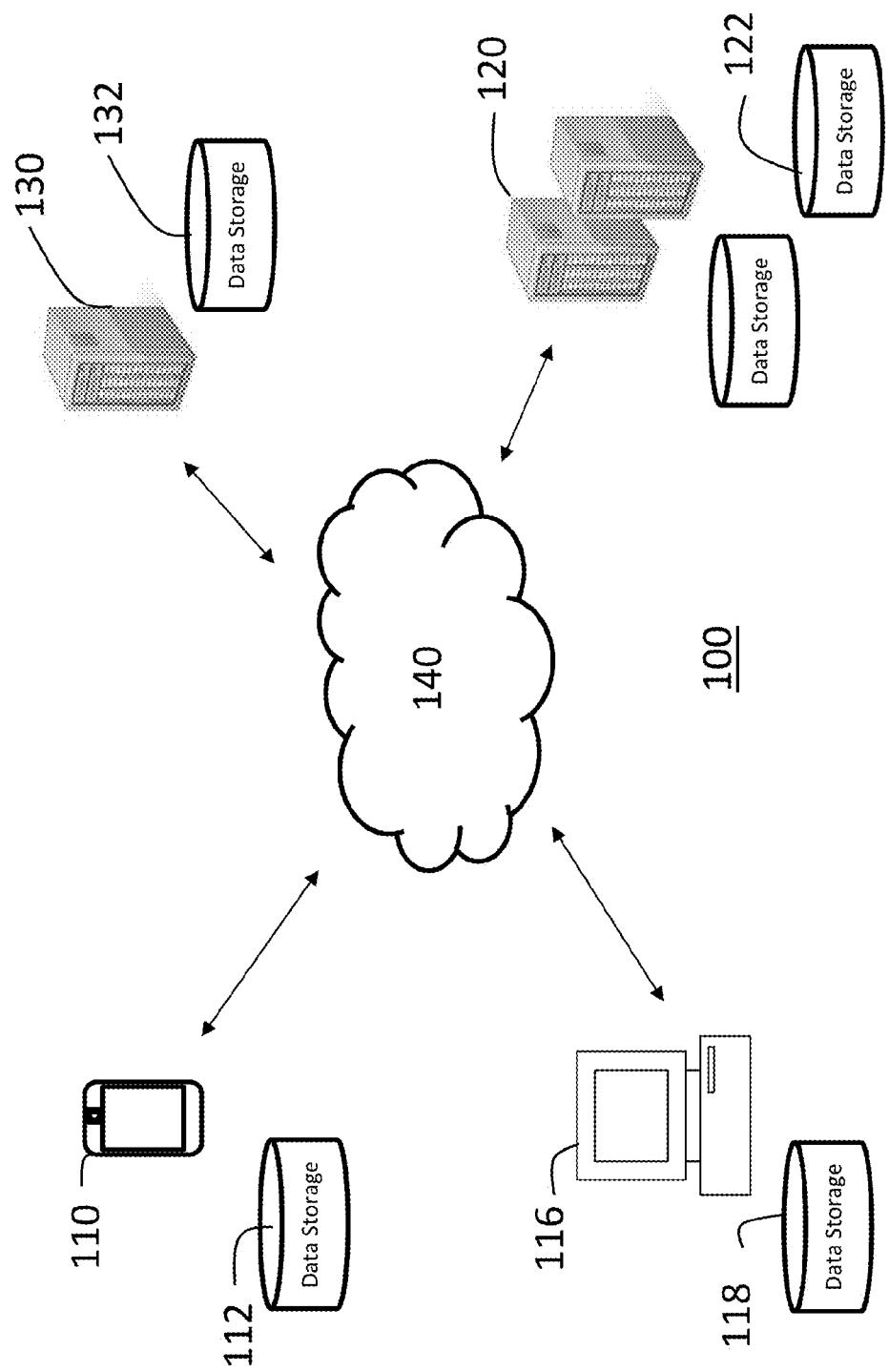
FIG. 1 is a block diagram of an exemplary system environment in accordance with one disclosed embodiment.

FIG. 1 illustrates a block diagram of an exemplary system environment 100 for enabling a user to try out one or more products. As shown in FIG. 1, the system environment 100 includes one or more user devices 110 and 116, such as a computer (e.g., personal computer, a computer terminal, a kiosk, etc.) and a portable or mobile computing device (e.g., a smartphone, a tablet computer, a laptop computer). The user devices 110 and 116 also include data storage devices 112, 118.

The system environment 100 also includes a product transaction system implemented through a server(s) 120 (e.g., a web server) and one or more data storage devices, such as data storage device 122. The product transaction system facilitates the offer and sale of products to a user through the user devices 110 and 116. Data storage of information can also be provided remotely through a remote data storage system (e.g., a remote or cloud storage) implemented through a data server 130 and data storage device 132.

The data storage devices 112, 118, 122 and 132 stores data, such as programs and executable code, databases, files and other information, to control an operation of the underlying computer-based device or system, and to facilitate product transactions (online or offline) and the "try out" feature of trying out products through a user device. For example, the data storage devices can store user profile data and product data. The user profile data can include user information, user images and associated parameters, user product preferences, user history and product images of products, such as those owned or previously browsed by the user, as well as other user information to facilitate a product transaction. The product data can include product images, image capture parameters, product description, product pricing information and product offer condition restrictions (e.g., time, quantity, subset of user, etc.) and other product related information. An example of profile data and product is described below with reference to FIGS. 25 and 26, respectively.

These systems, devices and components of FIG. 1 communicate with each other across a network infrastructure 140, which can include one or more wireless and wire-line networks (public and/or private), and can provide access across the Internet. Exemplary components of user devices 110 and 116 and servers 120 and 130 are described below with reference to FIG. 22 and FIG. 23.

Figure 2:
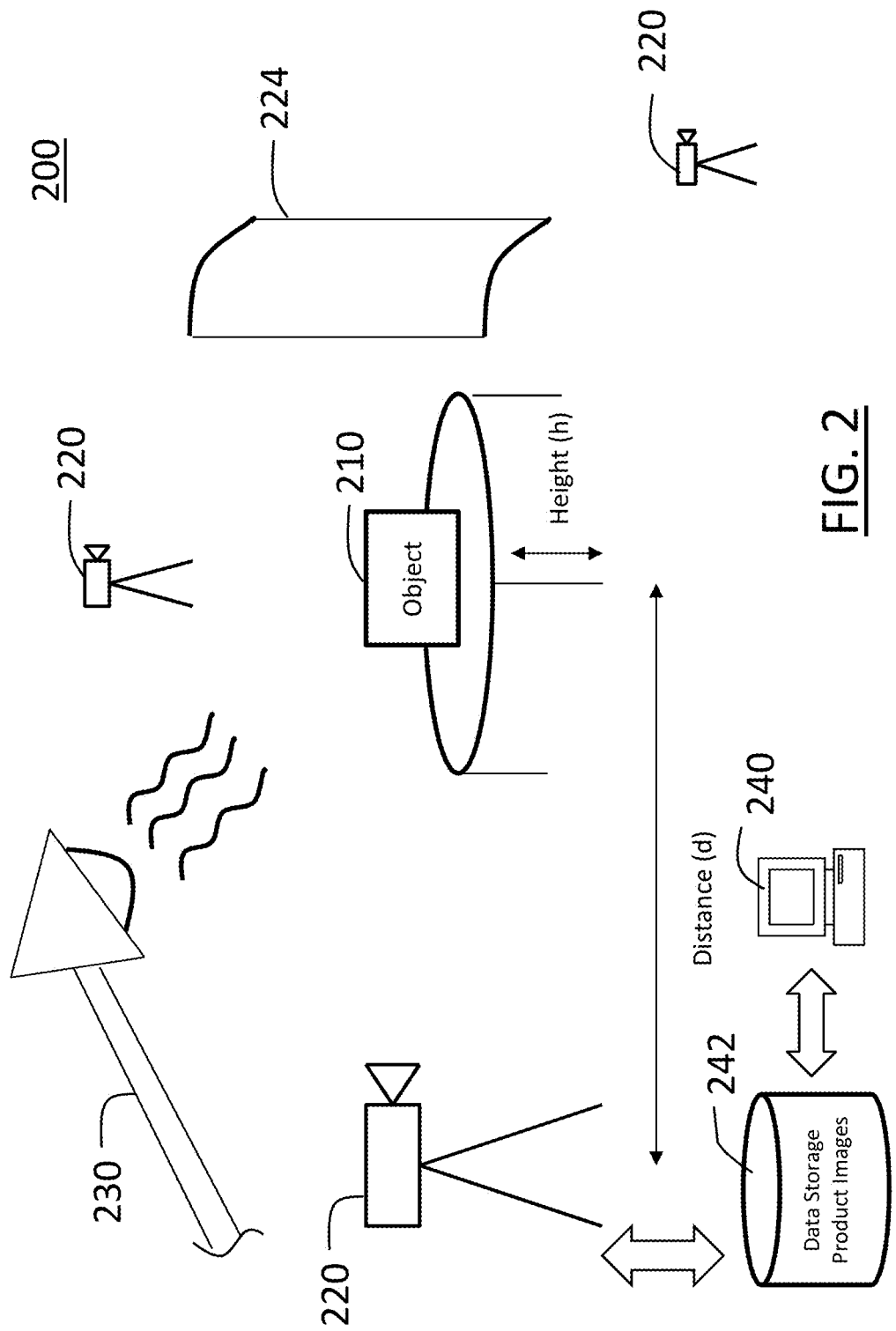
FIG. 2 is an overview of an exemplary environment for capturing images of an object such as a product, at different viewpoints in accordance with a disclosed embodiment.

FIG. 2 is a block diagram of an exemplary photo shoot environment 200, by which images of a product are captured or taken. The environment 200 includes one or more image capture devices 220 (e.g., video cameras) for capturing images of an object 210 from different viewpoints (or perspectives). In various examples discussed herein, the object is a product, such as a good and/or service. The captured product image viewpoints can include any viewing position, angle or point of an object in 2-D or 3-D space, such as a front view, side-front views, side views, a back view, side-back views, a top view, top-side views, a bottom view and bottom-side views.

In this example, the product object is placed on a table 240 that is positioned at a predetermined distance (d) and height (h), and is subjected to a predetermined intensity of light from a light source 230. A background(s) 224 may be placed in appropriate position(s) behind or around the object, and may be white or some other color as desired. The background color selection may serve multiple purposes, including providing an appealing backdrop when displaying the product image (e.g., as part of product listing or detail page online), enabling the filtering out of the background from the product image, or replacing viewable background pixels in the product image with transparent, translucent or opaque pixels.

Figure 24A:
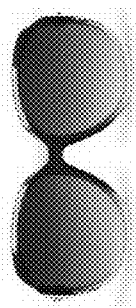
FIGS. 24A, 24B and 24C show product images of a product, e.g., sunglasses, taken at different viewpoints in accordance with an embodiment.
Figure 24B:
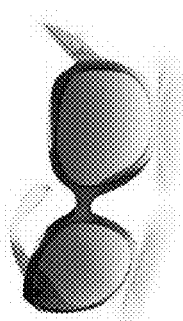
Figure 24C:
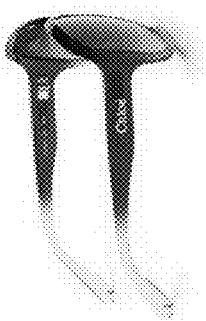

For products of similar categories, e.g., sunglasses, the images are captured using the same or essentially the same parameters (e.g., distance, height, light intensity and so forth). This provides a frame of reference for all product images in the same or similar categories or class, and facilitates mapping and overlay of the images when trying out the products, as discussed in the disclosure. Examples are shown in FIGS. 24A, 24B and 24C of images of a product, e.g., sunglasses, taken at a few different viewpoints in accordance with an embodiment.

The product images are stored in a data storage device 242, and can be further processed and tagged with other information through a computer system 240. For example, with the use of computer system 240 executing image editing tools or programs, the product images can be filtered to eliminate background and to add transparent pixels. For example, pixels identified as background (e.g., white pixels) are converted to transparent pixels. This approach is related to green-scene techniques often used in film. A solid color background can also be used for product extraction from the source image. Further, the images can be stored along or tagged with other information including, for example, image metadata, the image capture parameters, viewpoint identifier of the product image and product information (e.g., product category/sub-category and product detail information). The viewpoint identifier can identify a particular position and orientation in 2-D or 3-D space at which the product image was captured/viewed, such as a front view, left-side view, x-y view, x-y-z view, and so forth.

In general, the metadata of an image of any object (e.g., product or user) can include characteristics of the image (e.g., resolution, compression, image format, date/time of capture, capture parameters) and descriptions of the object. If the object is a product, the metadata can include any product description, such as those shown in product data of FIG. 26, and the information can be used for the purposes of cataloging and searching images.

B. Exemplary Processes

Various exemplary processes are described below with reference to FIGS. 3 through 9, and can be implemented in the system environment shown in FIG. 1. The various processes, or sub-processes, described in these figures and throughout this disclosure are provided as examples for the purposes of explanation of the "try out" and other features, and may be implemented on the client side (e.g., user device 110 or 116), server side (e.g., servers 120 and 130) or in a distributed manner between the client(s) and the server(s). The operations of each of the processes shown in the figures can also be implemented in a different order or combined, and may include or not include one or more of the operations. Further, the processes described in this disclosure can be implemented by or through an internet or mobile app. In addition, these processes can also be implemented to perform multiple try outs on an object image that includes multiple objects (e.g., two or more people) on which to try out products.

Figure 3:
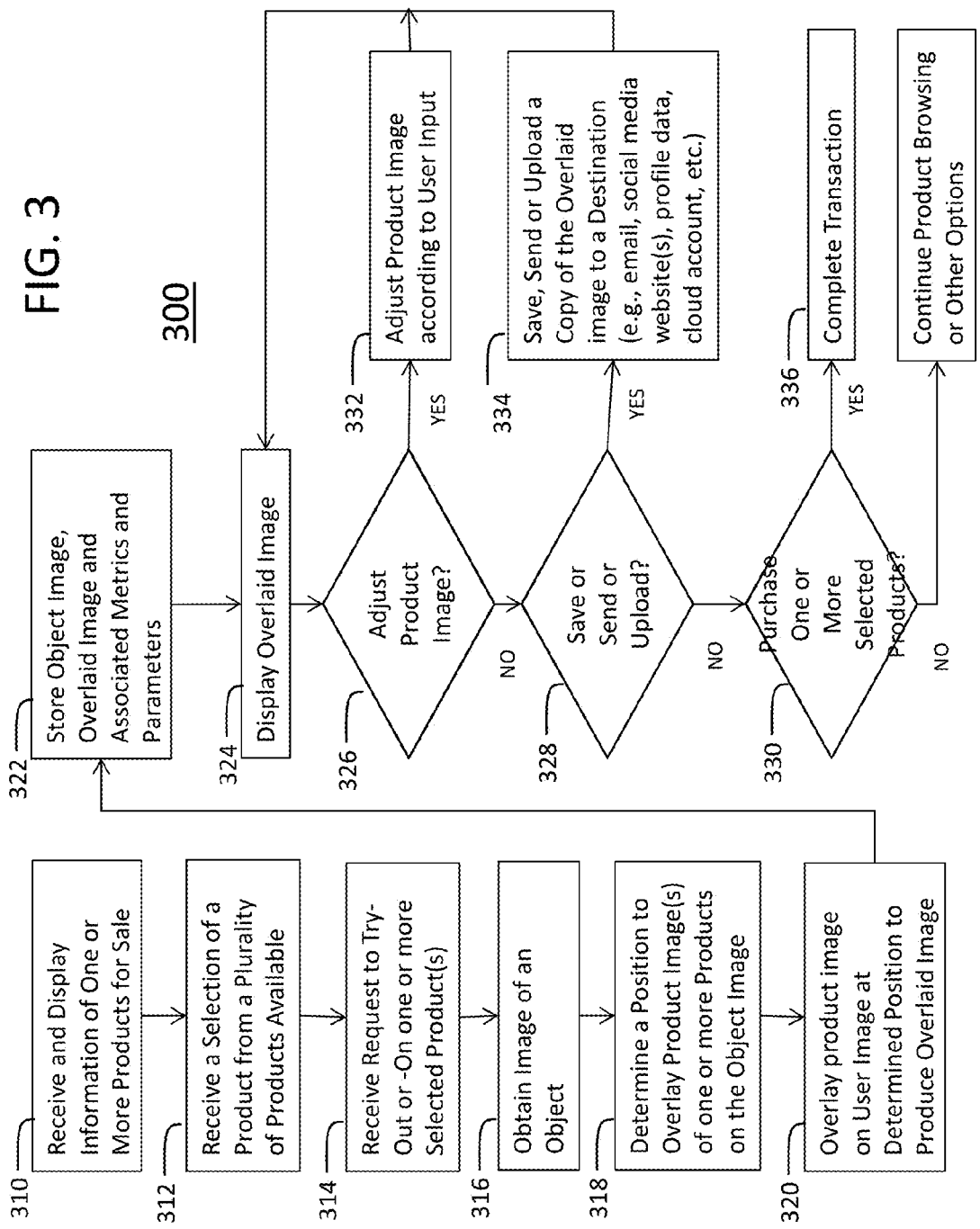
FIG. 3 is a flow diagram of an exemplary process of trying out a product in accordance with a disclosed embodiment.

FIG. 3 is a flow diagram of an exemplary process 300 by which a user can try out a product in accordance with a disclosed embodiment. At reference 310, the user device receives and displays product information for one or more products offered for sale, such as provided by a product transaction system (e.g., online store or business). The product information can include a product description (e.g., brand name and product identifier), pricing information (e.g., retail price, discount and savings), product image(s) taken at different viewpoints and restricted conditions, if any, including a remaining time duration of the sale and/or a remaining quantity and any other conditions. For example, the product may be offered for sale under restricted conditions, such as of time and/or quantity.

At reference 312, the user device receives user input (or command) reflecting a selection of one or more products from a plurality of offered or available products. The user device may display more detailed information concerning the selected products, or offer the user an opportunity to try-out the products.

At reference 314, the user device receives a request from the user to try out the one or more selected products. At reference 316, the user device obtains an image of the object (also referred to as "object image") with which to try out a product. For example, the object can be a person or multiple people, such as the user or users, the product can be a wearable good, and the object image is a real image of the user(s). Alternatively, the object image can also take the form of a 3-D generated model, such as of the user or of a generic object profile. The object image can be a current image to be captured through an image device (e.g., a video camera) on or in communication with the user device, or a stored image (e.g., one which was previously captured). The object image can be a frame from a live video or a stored video.

At reference 318, the user device determines a position to overlay an image of a product (also referred to as "product image"), which was selected by the user, on the object image. For example, one or more features, including their positions and/or bounds, are identified in the object image. The overlay position is then determined from this information. The information about the features, such as for facial features, may already be stored along with the object image as native components when captured or added after image capture through image detection techniques. For example, the object image can be processed to detect for particular features, using an image/feature detection algorithm, which may, for example, involve feature detection, alignment, appearance normalization, feature representation (e.g., binary patterns), feature extraction, and matching. If there are multiple objects (e.g., two or more people), the user device can determine a position for each object (e.g., each person) identified in the object image.

At reference 320, the user device overlays the product image on the object image at the determined position(s) to produce an overlaid image. The user device may also adjust the size, such as the width or height, of the object image or the product image, either manually through user input or automatically.

At reference 322, the user device stores the object image, the overlaid image and associated information including product information and metrics and parameters of features in the object image (e.g., locations of particular features, distance, slope or angle between particular features, etc.). At reference 324, the user device displays the overlaid image, and thus, allows the user to try out the product through the user device.

Figure 25:
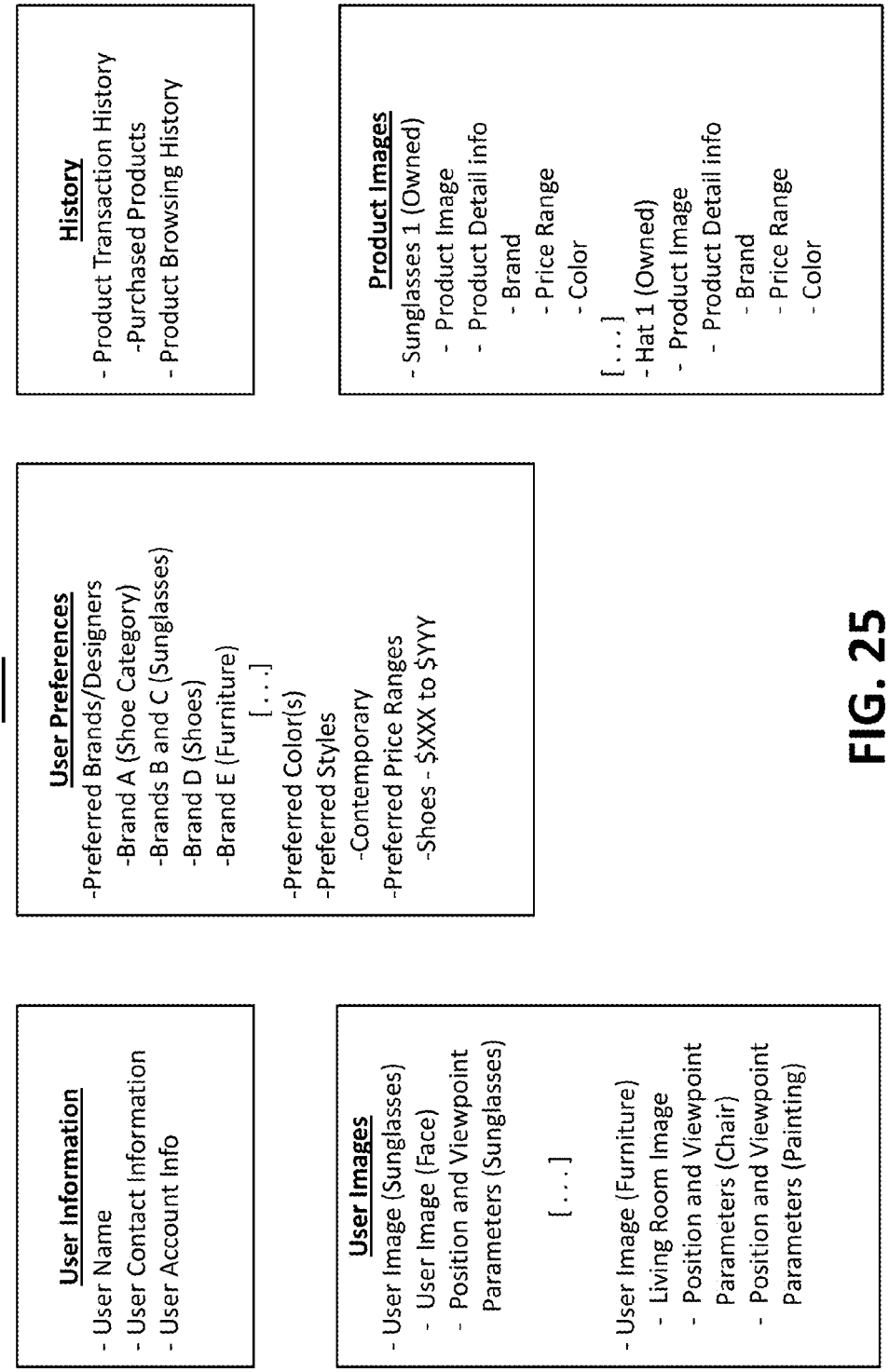
FIG. 25 is an exemplary profile data for a user in accordance with an embodiment.

At reference 326, the user device determines whether to adjust the product image, such as in response to user input. If so, the user device adjusts the product image based on user inputs. For example, the position and size of the product image is adjusted in relation to the object image on which it is overlaid. If no adjustment is to be performed, the process 300 proceeds to reference 328 in which the user device determines whether to save, send or upload the overlaid image to a destination. Of course, any data or information can also be stored automatically or absent user action, such as position and size to assist in additional product try-out. If the overlaid image is to be saved, sent or uploaded, the user device saves, sends or uploads the overlaid image and associated information to a designated destination. For example, the user device saves the overlaid image and associated information locally or remotely, or saves it to the user's profile data (e.g., an example of which is shown in FIG. 25); the user device sends the overlaid image and associated information by email to a remote destination; or the user device uploads a copy of the overlaid image to a social media site (e.g., Facebook, Twitter, etc.) of the user or some other entity.

If there is no request to save, send or upload, then the process 300 proceeds to reference 330 in which the user device determines whether a request has been made to purchase one or more of the selected products. If so, the user device interacts with the product transaction system to complete the purchase transaction at reference 336. Otherwise, the user device allows the user to continue product browsing or to perform other operations through the device.

Figure 4:
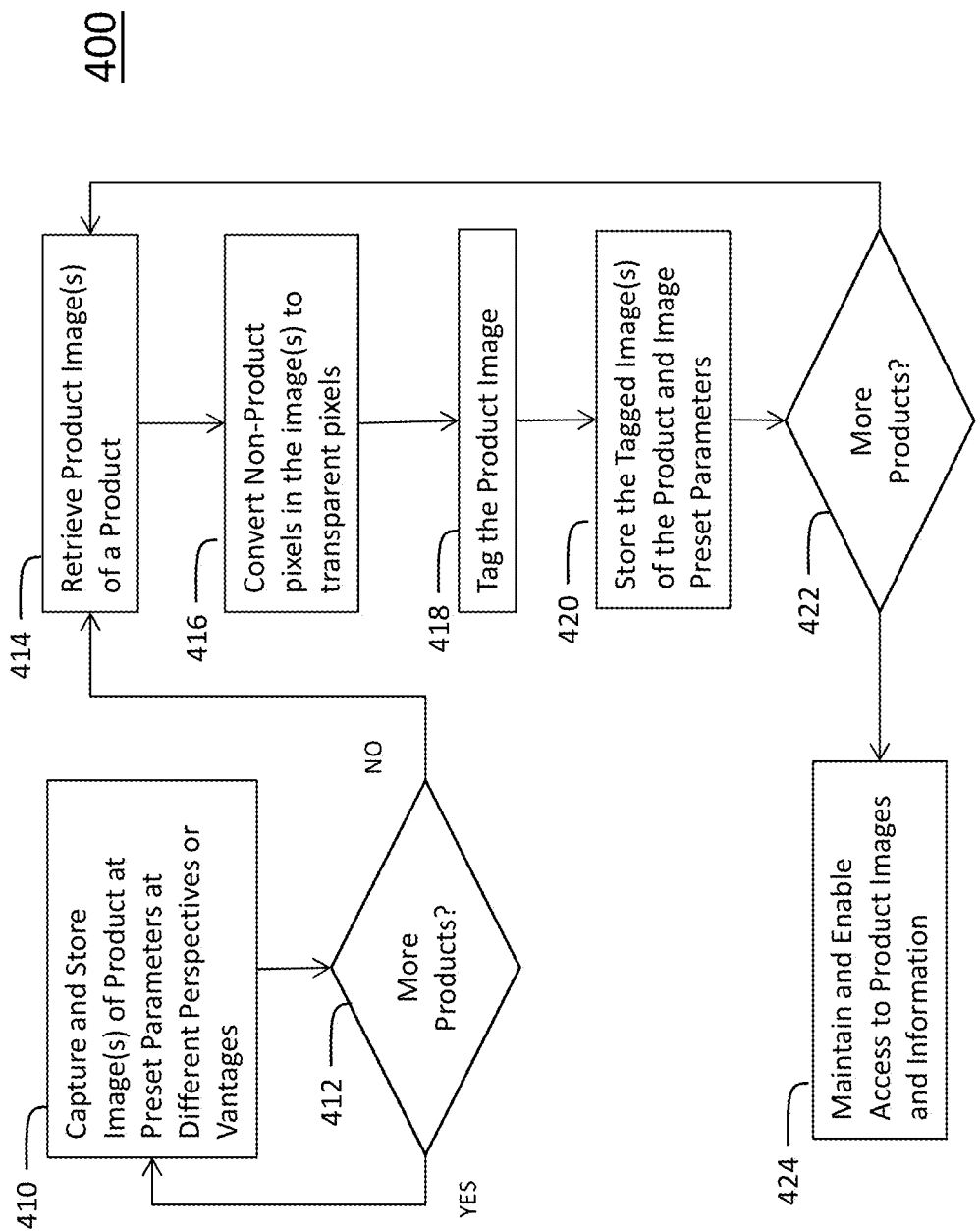
FIG. 4 is a flow diagram of an exemplary process of capturing images of an object, such as a product, in accordance with a disclosed embodiment.

FIG. 4 is a flow diagram of an exemplary process 400 of capturing images of a product ("product images") in accordance with a disclosed embodiment. The process 400 may be implemented in the environment of FIG. 2 with image capture device(s) to capture product images and a computer system having image editing tools or programs to perform image processing and tagging of images.

At reference 410, one or more images of a product are captured at different viewpoints. At reference 412, a determination is made of whether there are more products. If so, the process 400 implements the capture and storage of images of the next product (at reference 410). Otherwise, the process 400 proceeds to reference 414 at which product image(s) are retrieved for image processing on a computer. At reference 416, the computer converts the non-product pixels in the product image(s) to transparent pixels. The computer may also adjust and match the transparency, including a level of transparency (e.g., transparent, translucent or opaque) and a color/shade (e.g., tint, brown tint, grey tint, etc.) of the pixels to reflect or match characteristics of the actual product. For example, the lenses of sunglasses are often tinted as particular color/shade. In this example, the pixels of the lenses are converted to transparent pixels with matching color/shade.

At references 418 and 420, through computer, the product image is tagged and stored with other information. This information may include other product data, if not already stored, such as image metadata, image capture parameters (e.g., distance, height, illumination intensity, magnification amount, etc.), viewpoint identifier of the product image and product information (e.g., product category/subcategory and product detail information).

At reference 422, a determination is made whether there are more product image(s) to process, and if so, the process 400 implements the operations identified by references 414 through 420 with the next product image. Otherwise, if there are no other products, the image processing is completed. At reference 424, the processed product images and tagged information are maintained, such as in a database for product data, for subsequent access thereto. In various exemplary embodiments, the product data can be used for product transactions and for the "try out" feature discussed in this disclosure. An example of product data is shown in FIG. 26.

Figure 5:
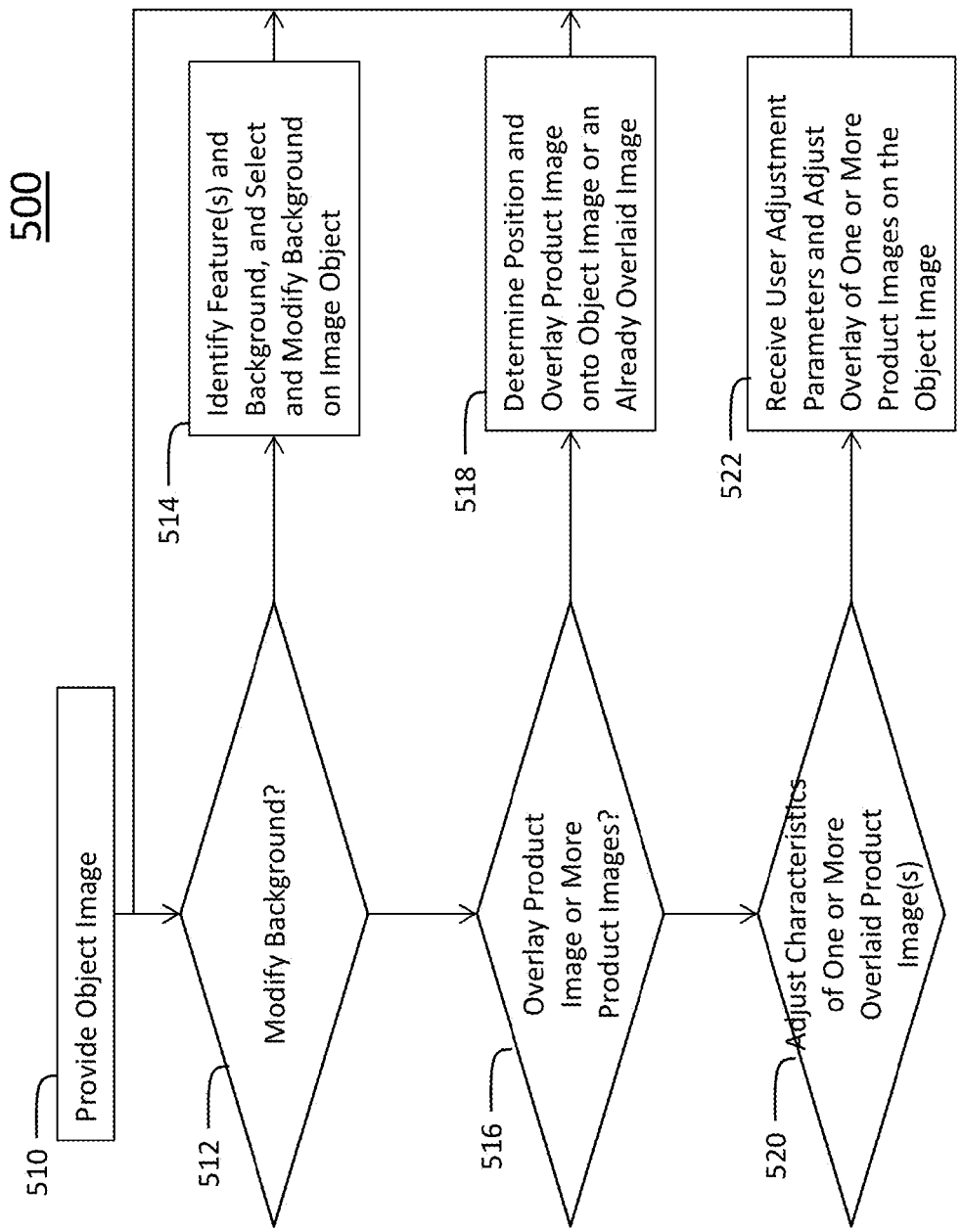
FIG. 5 is a flow diagram of an exemplary process of modifying or adjusting different aspects of an image or an overlaid image in accordance with a disclosed embodiment.

FIG. 5 is a flow diagram of an exemplary process 500 of modifying or adjusting different aspects of an image or an overlaid image in accordance with a disclosed embodiment.

At reference 510, an object image is provided. The object image may be a current or prior captured image. The object image can be stored locally on or remotely from the user device. Further, one or more product images may already be overlaid on the object image.

At reference 512, the user device determines whether to modify a background in the object image. If background modification is to be implemented, the user device identifies feature(s) and a background in the object image and then provides a selection of replacement backgrounds, at reference 514. The user selects a background, and in response, the user device modifies the object image with the selected background. The features are retained in the modified object image with the new background.

For example, the image object may be an image of a person taken somewhere outside at night, and the product category is sunglasses. The user device identifies features, e.g., the person or the person's head and torso, and the background (e.g., night time outside scene). The user is provided with a selection of other backgrounds, such as (1) sunny day at the beach background, (2) sunny day in a city background, and so forth. In this way, the user can change the background scenery, which can be a real world image, to assist him or her in making a more informed decision on whether to purchase a particular sunglasses product.

Turning back to process 500, if no background modification is sought, the user device determines whether to overlay one or more product images on the object image, at reference 516. If an overlay operation is to be implemented, the user device determines an overlay position and overlays the product image on the object image, at reference 518. The position can be determined using the various approaches discussed herein, and the other product images may already be overlaid on the object image. For example, the feature in the object image is a person and a product image of sunglasses is already overlaid thereon. The user can overlay other product images of products such as jewelry, a hat and so forth. These products may also be available for sale under unrestricted or restricted conditions, or may be goods and/or services previously purchased by or owned by the user (such as those identified in a user profile data, an example of which is shown in FIG. 25).

If no overlay is requested at reference 516, the user device determines whether to adjust characteristics of one or more of the overlaid product images on the object image, at reference 520. If so, the user device receives user adjustment parameters and adjusts the overlay of one or more product images on the object image. The adjustment parameters can include a position of a product image on the object image, and a size of the product image including height, width and/or length. If the user device includes a touch screen, the user can, for example, adjust the overlay of the product image using touch gestures, e.g., dragging the product image to a desired position on the object image or using a pinching gesture on the product image to shrink the size of the product image on the object image or using an expanding gesture (e.g., the reverse of pinching) to expand the size of the product image on the object image.

After any of the operations identified in reference 514, 518 or 522, the process 500 proceeds back to reference 512.

Figure 6:
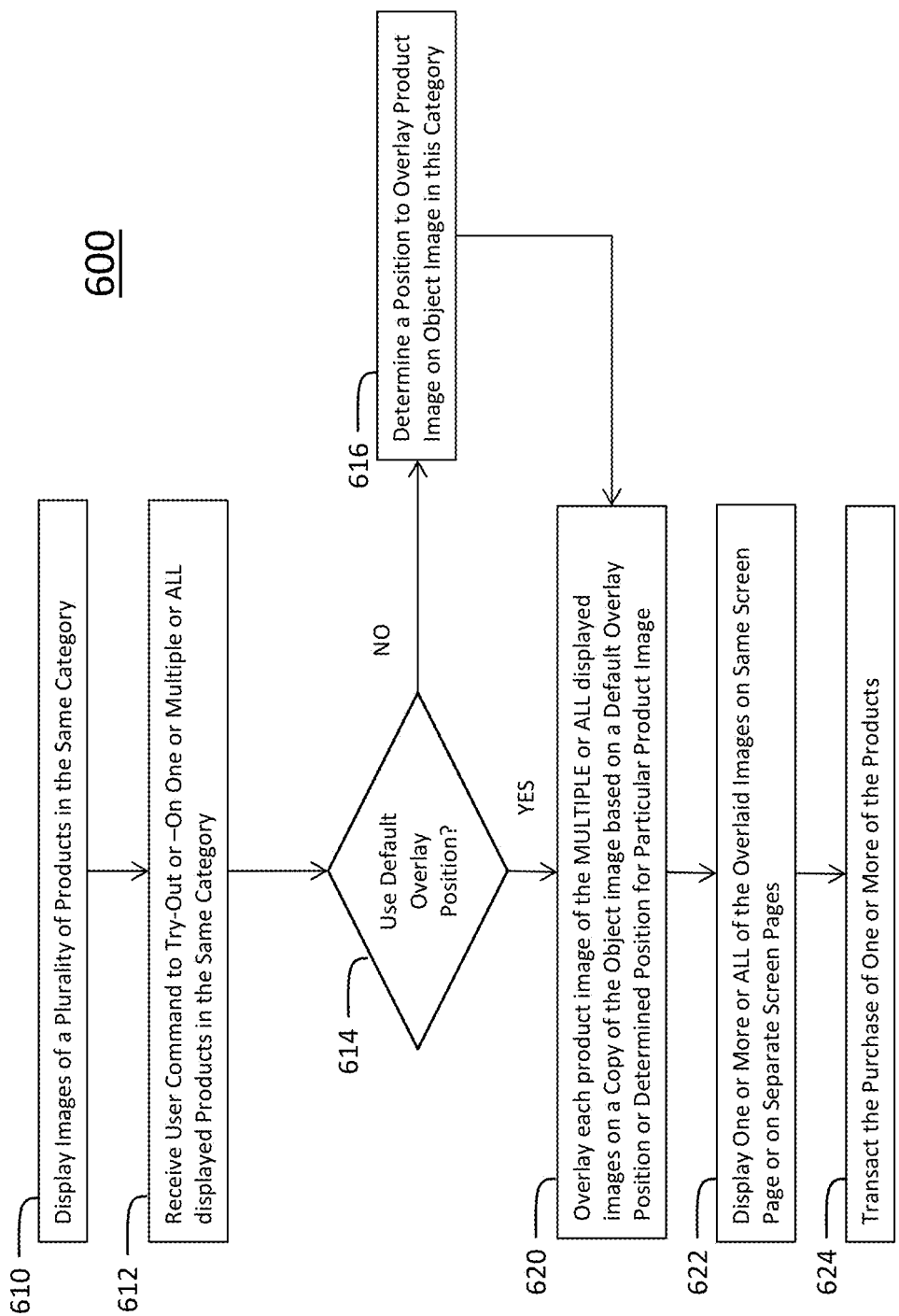
FIG. 6 is a flow diagram of an exemplary process of trying out one or more or all products in accordance with a disclosed embodiment.

FIG. 6 is a flow diagram of an exemplary process 600 of trying out one or more or all products in accordance with a disclosed embodiment.

At reference 610, the user device displays product images of a plurality of products in the same or similar categories, such as in a product listing. The product images of the products may be displayed along with product information, and the products may be offered for sale under unrestricted or restricted conditions. At reference 612, the user device receives a user input to try out ONE or MULTIPLE (or more) or ALL of the displayed (or listed) products.

At reference 614, the user device determines whether to use a default overlay position when overlaying each of the product images on a separate copy of the object image. For example, if an overlay position was previously determined with respect to one of the displayed products or another product in the same category, then that position can be used as a default for all other product images of products in the same category. Default overlay positions may be stored in association with a particular object image for one or more product categories (see e.g., the user profile data in FIG. 25). If the user device does not use a default overlay position, then the user device determines a position for each product image or a position for one product image (to be used for all other product images in the same product category) at reference 616.

In either case, the process 600 proceeds to reference 620 in which the user device overlays each of the ONE, MULTIPLE (or more) or ALL product images on a separate copy of the object image based on the default overlay position or the determined position. At reference 622, the user device displays the overlaid images of one or multiple (or more) or all of the products on the same screen page or on separate screen pages. At reference 624, the user through the user device can transact the purchase of the one or more products.

It should be understood that different viewpoints for the product image, as discussed in this disclosure, can also be used in this example when overlaying product image on an object image. As with the position, a default viewpoint of the product image can also be used or determined from evaluation of the object image.

Figure 7:
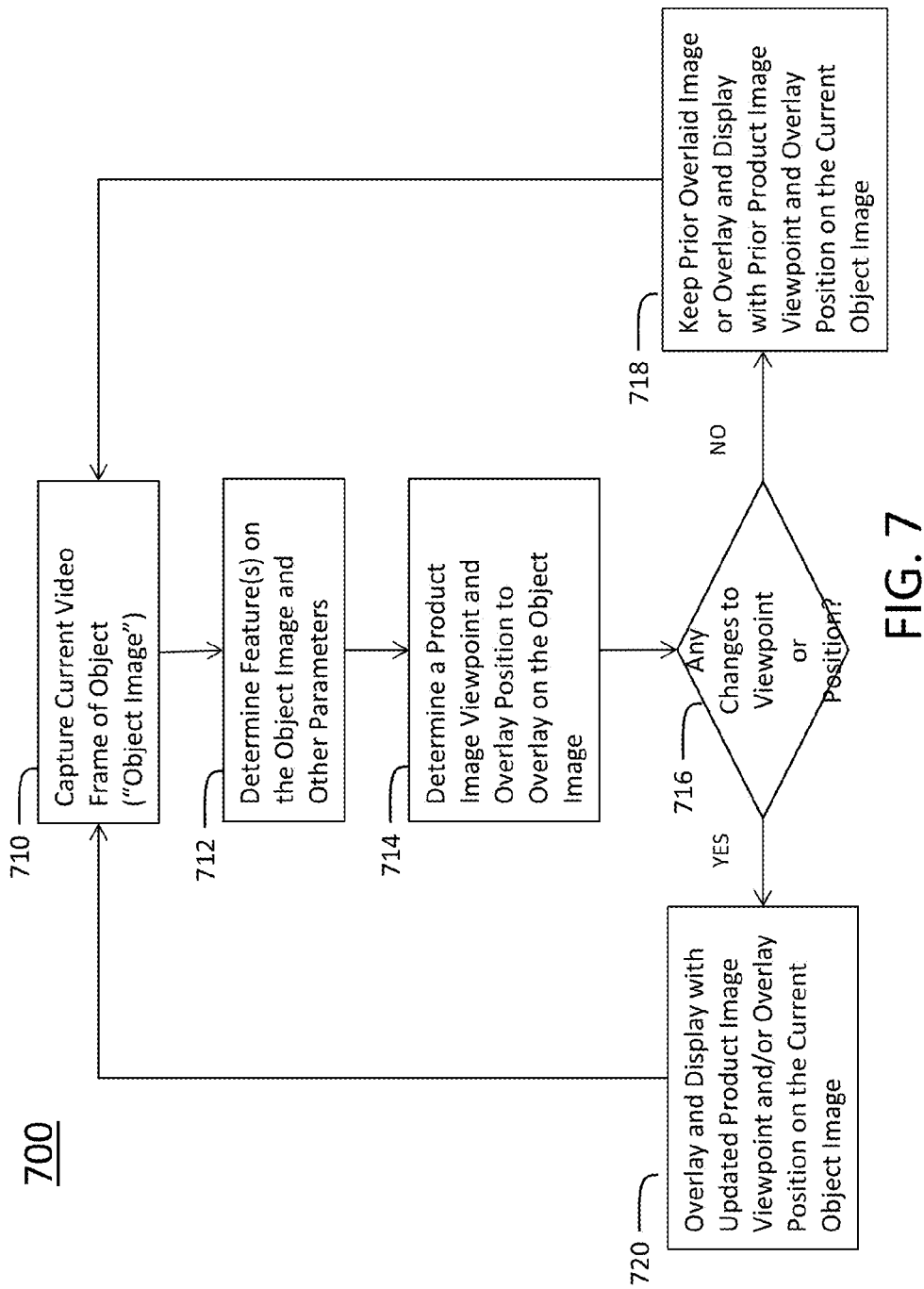
FIG. 7 is a flow diagram of an exemplary process of trying out a product in accordance with a disclosed embodiment.

FIG. 7 is a flow diagram of an exemplary process 700 of trying out a product in accordance with a disclosed embodiment.

At reference 710, a current or real-time video frame is captured of an object. At reference 712, the user device determines one or more features on the object image and other parameters based on the features. For example, when trying out wearable items, the feature(s) of an object(s) may relate to a person or people and different parts of the person, e.g., face, left eye, right eye, left ear, right ear, nose, neck, shoulders, left hand, right hand, left feet and right feet. The parameters may include points between features, a position of a feature in relation to another feature, an angle or a slope defined by two features, and the position of a feature in comparison to its position in a prior object image. Information as to features in an object image may already be present in image of the captured object as native components, or image/feature detection may be performed At reference 714, the user device determines a product image viewpoint and an overlay position for overlaying a product image on the current object image. At reference 716, the user device determines whether the viewpoint and/or position has changed or significantly changed in comparison to those of the prior object image, e.g., a prior video frame of the object. A threshold or standard of deviation can be used to ascertain whether a change in position or viewpoint is of a substantial nature.

If the position and viewpoint have not changed or have not changed substantially, the user device may keep and display the product image of the prior viewpoint at the prior position on the current object image (e.g., a current captured video frame) or may keep and display the prior overlaid image of the prior object image (e.g., the prior captured video frame), at reference 718. Otherwise, if the position and/or viewpoint have changed substantially, the user device selects the product image at the determined viewpoint and overlays and displays the product image at the determined position on the object image at reference 720. This approach can help to stabilize the product image being composited onto a real-time video feed (e.g., reduce jumpiness). The video frame rate can also be altered, e.g., slowed down or sped up, to accommodate processing time for feature detection and compositing or other operations that may need to be implemented. In any event, in either case, the process 700 then proceeds back to reference 710 for capture of another video frame of the object.

Accordingly, in this example, the product image is adjusted, such as in real-time, along with the video feed of the object image to provide an enhanced try out of the product through the user device. For example, a user can try out sunglasses, and view different perspectives of the sunglasses product by moving or turning the user's head in different directions. Furthermore, the user may save, send, upload or modify an overlaid image at any time. In addition, multiple try outs of the same or different products, in the same or different categories, can also be performed on the same object image. For example, the object image can include images of two or more objects (e.g., two or more people), on which to try out the same or different products.

Figure 8:
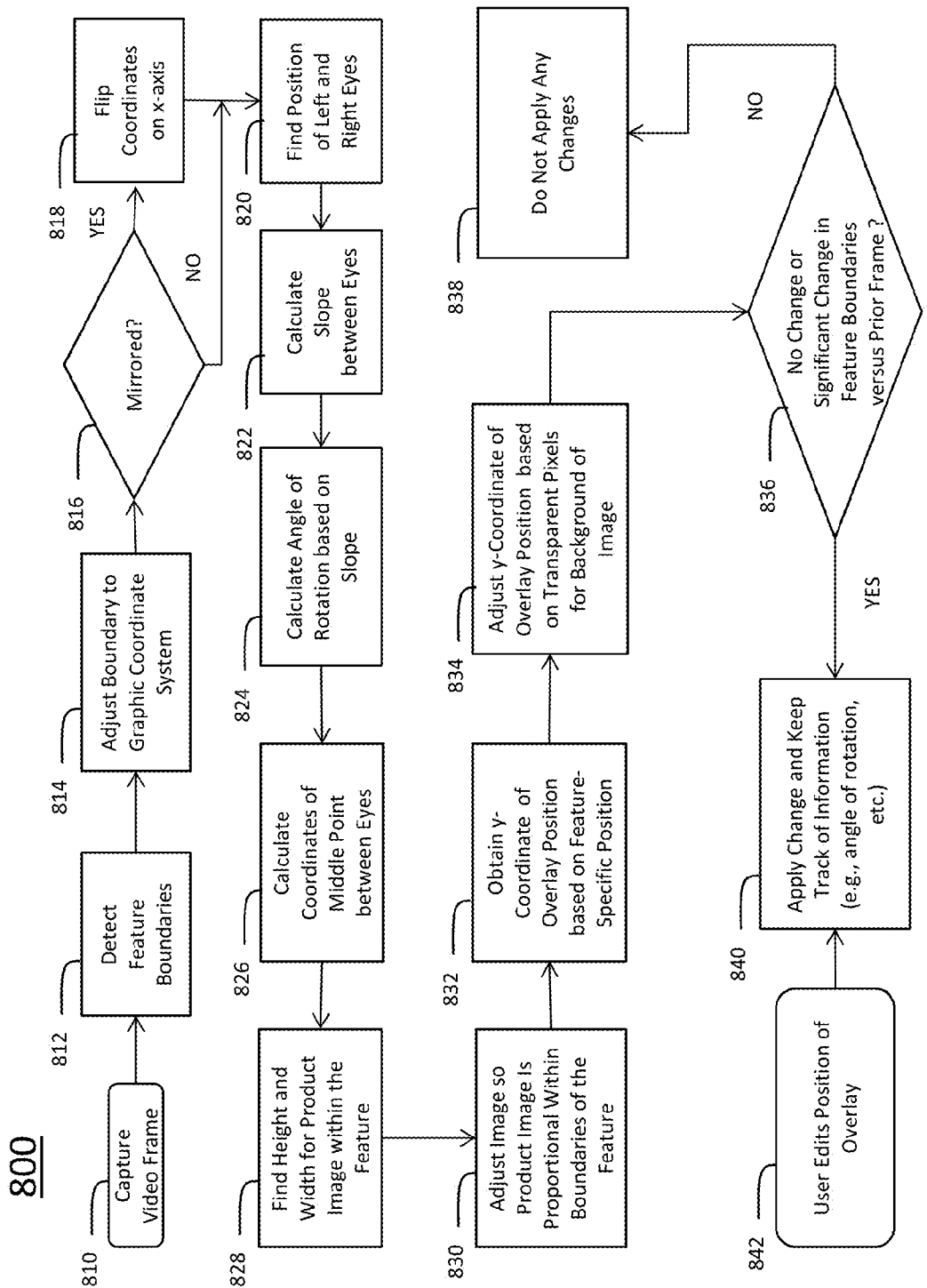
FIG. 8 is a flow diagram of an exemplary process of trying out a product in accordance with another disclosed embodiment.

FIG. 8 is a flow diagram of an exemplary process 800 of trying out a product in accordance with another disclosed embodiment. In this example, the object is a person, the object image contains features in the form of a face, a left eye, a right eye and a nose, and the product is eyewear such as sunglasses.

At reference 810, a video frame of an object (or "object image") is captured. At reference 812, a boundary of a feature in the object image is detected. For example, a face feature and its bounds or boundaries are detected or identified in the object image. The boundaries may be a rectangle boundary, circle boundary or any suitable shape for which coordinates can be mapped to a graphics coordinate system for an image processing system. The coordinates may be based on Cartesian coordinates, polar coordinates or any suitable coordinate system.

At reference 814, the boundary is adjusted to match a graphics coordinate system used to perform image processing on the object image. At reference 816, the determination is made on whether the object image is mirrored. If mirrored, the coordinates are flipped on the x-axis at reference 818. At reference 820, a position of a left eye and a position of a right eye is found. This information may already be present in the image of the captured object as native components (which may be stored in the image metadata), or image/feature detection may be performed to identify the position of the left eye and the right eye. At references 822 and 824, a slope between the left eye and the right eye is calculated, and an angle of rotation is calculated based on the slope between the eyes. Thereafter, at reference 826, the coordinates of a middle point, such as an x- and y-coordinate, between the left eye and the right eye are calculated. The middle point (e.g., x and y-coordinates of a middle point) can be used for more accurate positioning of the product image of the eyewear product on the face feature of the object image.

At reference 828, a determination is made of a new height and a new width for the product image within the feature while maintaining its aspect and ratio. At reference 830, the product image is adjusted so that the width of the product within the product image is proportional to the bounds of the feature. At reference 832, a y-coordinate overlay position for the product image is obtained based on a feature-specific position. For example, in overlaying sunglasses, the eyes are one-fourth (¼) down from the top of the feature bounds and the top of the sunglasses frame is arranged in relations to the top of the feature.

At reference 834, the y-coordinate of the overlay position is adjusted based on transparent pixels for the background of the product image, and a final overlay position, such as a final x-coordinate and y-coordinate, is determined. At reference 836, a determination is made on whether the final overlay position for the bounds of the product image has changed or substantially changed in comparison to the prior object image, e.g., the prior captured video frame. If not, no changes are applied at reference 838. For example, the position of the product image as applied to the current object image (e.g., the current video frame) remains unchanged or substantially unchanged from that as applied to the prior object image (e.g., a prior video frame). When comparing overlay parameters between a current object image and a prior object image, a threshold or standard of deviation can be used to ascertain whether a change or significant change has occurred. The process 800 then proceeds to back to reference 810 to capture the next video frame.

Otherwise, if there has been a change or a substantial change to the final position, the updated final overly position is applied when overlaying the product image on the object image, at reference 840. Further, the information or parameters associated with the final overlay position are stored or tracked, and can include the slope between the eyes, the angle of rotation based on the slope, the height and the width of the product image, and the overlay and other coordinates used to determine the overlay position.

At reference 842, the user can at any time adjust the characteristics of the product image as overlaid on the object image. These adjustments can include a size (e.g., reduce or enlarge) and/or a position of the product image as overlaid on the object image. When or after implementing an adjustment operation, the user device may stop the automatic update of the position of the product image with each subsequent video frame, either temporarily or until the user stops manually adjusting the product image, and instead use the user adjusted overlay position with each subsequent video frame.

Although the process 800 of FIG. 8 is described with reference to one object, e.g., a person, in the object image, the process can be implemented to perform multiple try outs on the same object image having multiple objects (e.g., two or more people). As discussed in this disclosure, the object image can include images of two or more objects (e.g., two or more people), on which to try out the same product or different products. For example, the operations of the process 800 can be performed to determine an overlay position of a product image on each of the separate objects in the same object image.

Figure 9:
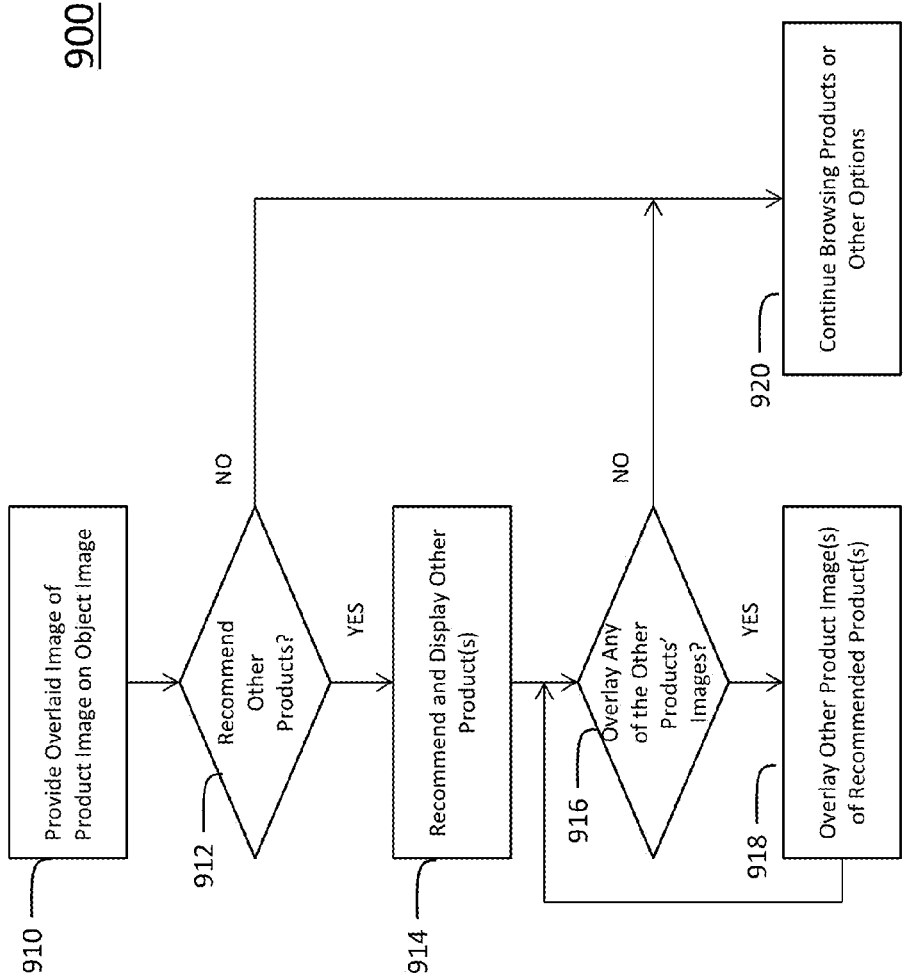
FIG. 9 is a flow diagram of an exemplary process of recommending other products to try out in accordance with a disclosed embodiment.

FIG. 9 is a flow diagram of an exemplary process 900 of recommending other products to try out in accordance with a disclosed embodiment.

At reference 910, an overlaid image of a product image on an object image is provided. In this embodiment, a user is provided an opportunity to view and try out other products in relations to one or more products being tried out by the user. At reference 912, a determination is made on whether to recommend other products, such as based on a user request. If not, the user device allows the user to continue browsing products or to implement other options.

If a recommendation is to be provided, the user device recommends and displays one or more other products, such as those in other product categories, at reference 914. The recommended other products can include a filtered subset of products, such as those that are currently available and subject to restricted or unrestricted conditions, that may be of interest to the user.

The recommendation may be implemented through a recommendation engine, implemented on the user device or the product transaction system, which evaluates various factors to filter and ascertain a subset of other products of interest to the user from a plurality of products. These factors may include: (1) the current product selected or tried out by the user, including the product's brand, price point, category (e.g., eyewear) or characteristics such as color(s) and style (e.g., generic, retro, preppy, etc.), other products that may match well with the product, and other information about the product; (2) the user's behavior or tastes, such as the user's preferences (e.g., preferred brands/designers, preferred color(s), preferred style(s) and preferred price range(s)), the user's product transaction or browsing history, products owned by the user, and other indicators of the user's shopping behavior; (3) a plurality of products, which are searchable, such as other products currently available or available in upcoming sales under unrestricted or restricted conditions; and/or (4) other factors which can help determine the user's interests in products and shopping behavior. Some or all of this information can be maintained or accessed from the user's profile data (see e.g., FIG. 25) and/or the product data (see e.g., FIG. 26).

For example, the recommendation engine is provided with the information that that the user is currently trying out a product, e.g., sunglasses Z, which is red. The recommendation engine evaluates available products (such as from the product data) in other categories related to "sunglasses" such as hats and scarfs, and filters out a subset of these products that match certain criteria, for example, the user's preferences and the user's tastes in light of the user's product transaction or browsing history (from the user's profile data), and/or the characteristics of the product such the color and style of sunglasses Z. The recommendation engine can also filter out any products that are already owned by the user. Accordingly, the recommendation engine returns a recommended product listing of a filtered subset of scarfs and/or hats that may be of interest to the user. The above describes a few exemplary recommendation factors or criteria for use in filtering or filtering out a subset of products that may be of interest to the user from a plurality of products. Other factors or criteria can be used separately or in combination with the above to recommend products to the user.

Turning back to process 900, at reference 916, a determination is made whether to overlay any of the product images of the recommended products. If not, the user device allows the user to continue browsing products or to perform other operations through the device. Otherwise, at reference 918, the user device overlays one or more of the product images of the recommended products on the already overlaid image based on the user selection. The process by which a product image is overlaid on the object image can be implemented through the methods and systems as discussed in this disclosure.

Although the above describes an example in which the product images of recommended products are overlaid on an already overlaid image, these product images can also be overlaid individually on an object image.

C. Exemplary Implementations

The following are examples of user interfaces and displays, provided through a user device (e.g., 110 and 116), in which a user can try out one or more products in relation to a real world environment depicted through an image(s). As discussed in this disclosure, the products may include those that are being offered for sale under unrestricted conditions or under restricted conditions. For example, the restricted conditions can include a restriction as to time and/or quantity, as well as other limitations including limiting the offer to a class or subset of users or consumer (e.g., preferred customers). An example of a restricted sale is a "flash" sale, where products may sell out in a short period of time or are offered for a short period of time.

Figures 10A, 10B:
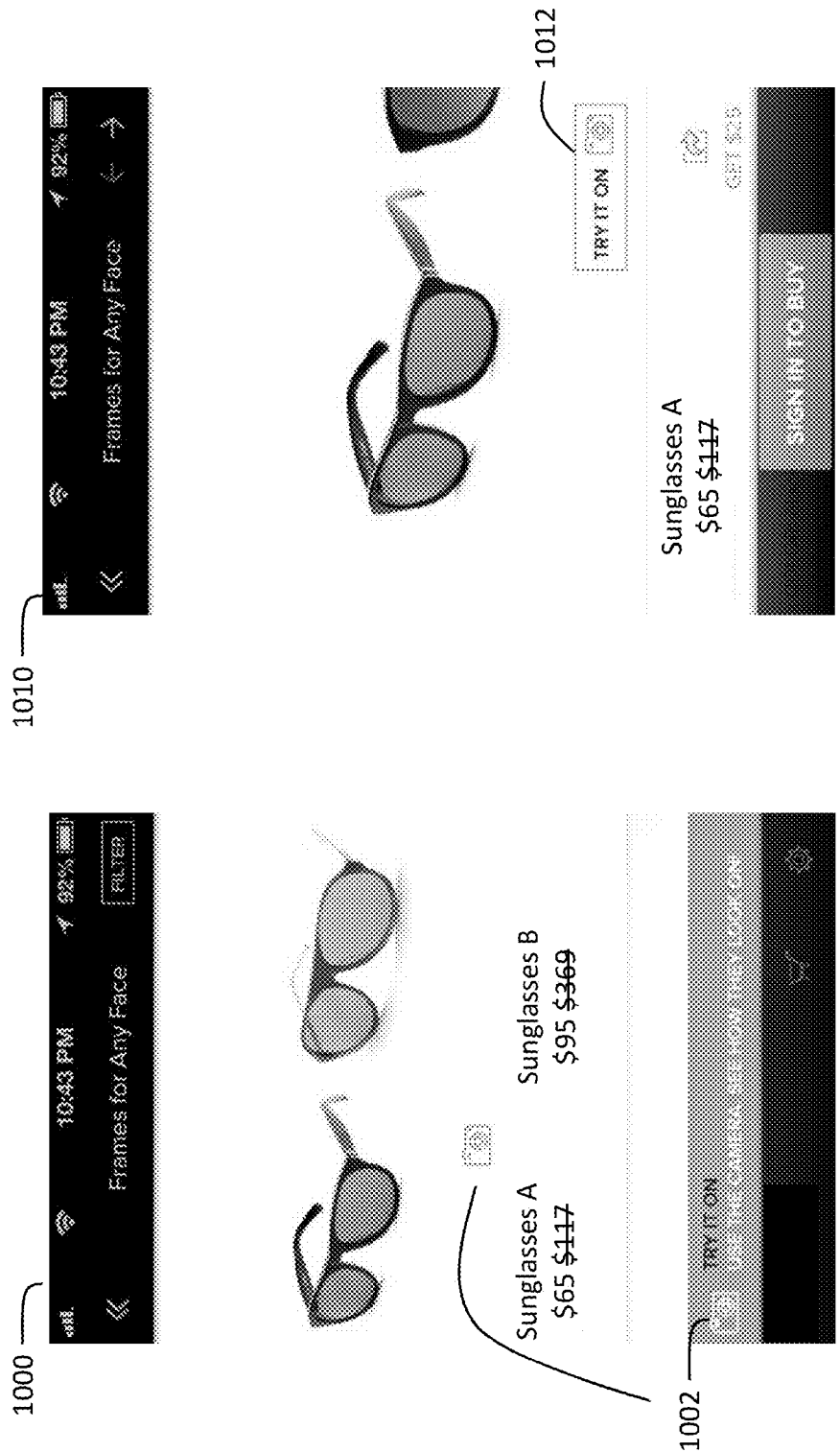
FIGS. 10A and 10B are screenshots of exemplary interfaces through which a user is provided a product listing and an option to try out a listed product in accordance with a disclosed embodiment.

FIGS. 10A and 10B are screenshots of exemplary interfaces 1000 and 1010, respectively, through which a user is provided a product listing and an option to try out a product in accordance with a disclosed embodiment. As shown in FIGS. 10A and 10B, the user interface displays a listing of products that are offered for sale. In this example, the products are sunglasses. The product listing includes product information (e.g., a product identifier, and a brand or manufacturer) and pricing information. An option to try out each of the products is also provided as shown by references 1002 and 1012. A user can scroll or browse through the various products through user input (e.g., a swiping left or right touch gesture or touching the left or right arrows on the touch screen). The interfaces 1000 and 1010 also allow the user to initiate a transaction to purchase a product, such as adding the product to a cart or signing in with the product transaction system to conduct a purchase transaction.

Figures 11A, 11B:
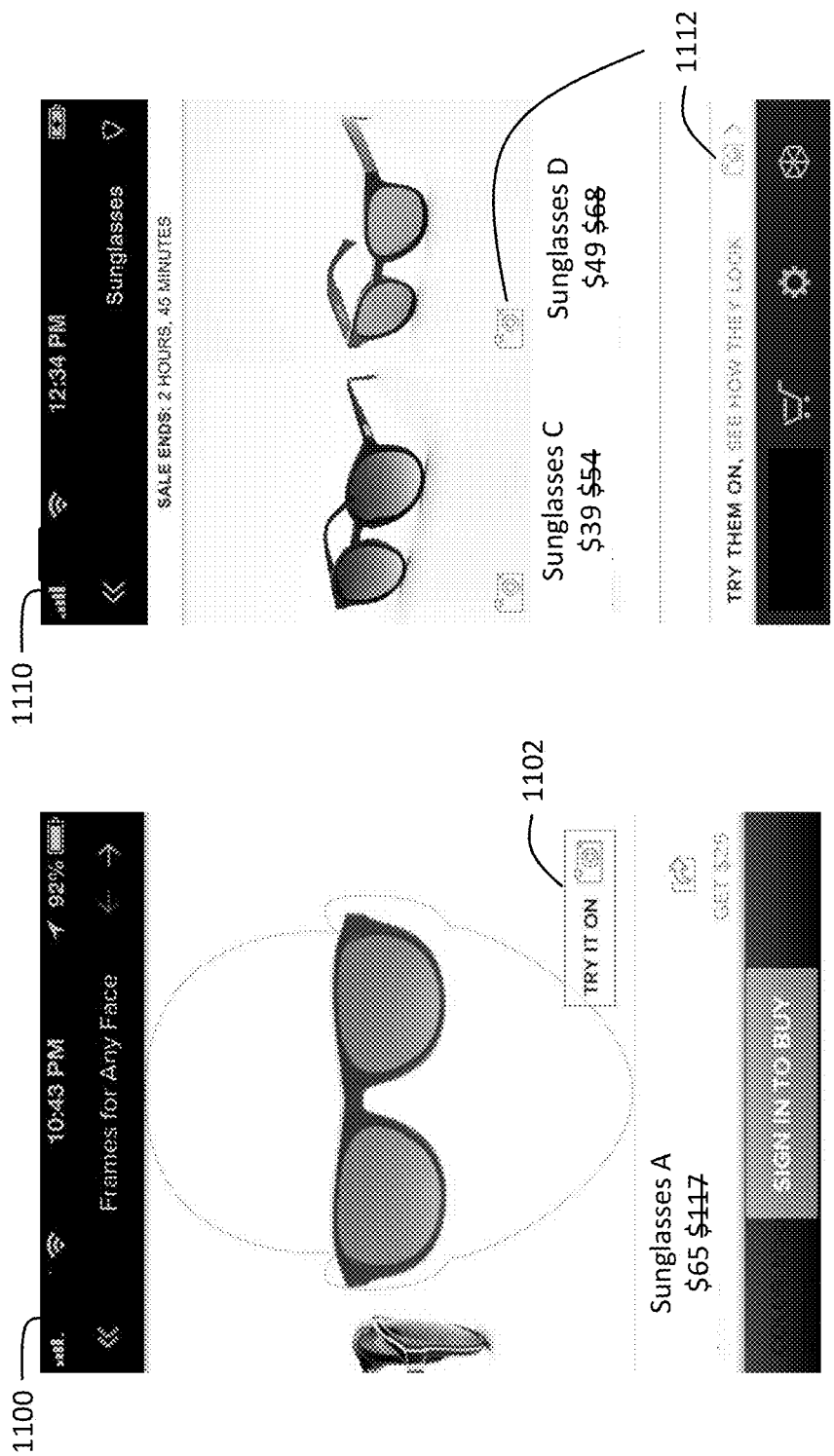
FIGS. 11A, 11B and 11C are screenshots of exemplary interfaces through which a user is provided product detail information and an option to try out the product in accordance with a disclosed embodiment.
Figure 11C:
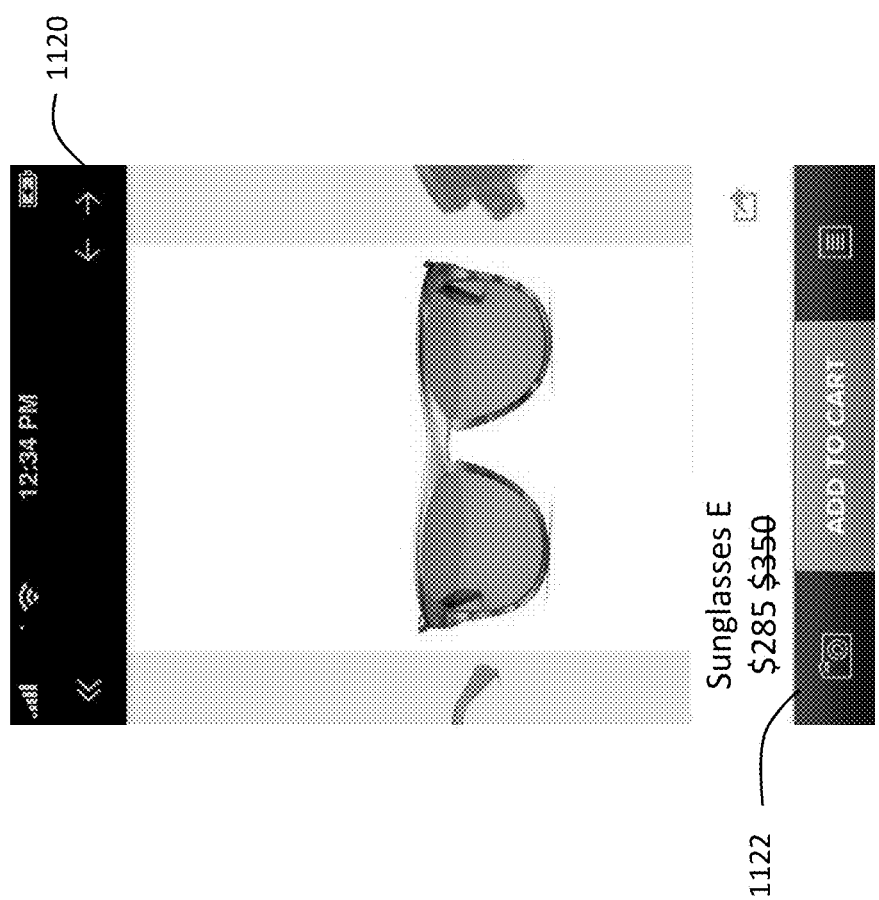

FIGS. 11A, 11B and 11C are screenshots of exemplary interfaces 1100, 1110 and 1120, respectively, through which a user is provided product detail information and an option to try out the product in accordance with a disclosed embodiment. For example, in the interface 1100 of FIG. 11A, the product Sunglasses A and its pricing is shown in relations to a facial outline. The user can browse or scroll through different viewpoints of the product (e.g., front view and a side view). In the interface 1110 of FIG. 11B, two different products Sunglasses C and Sunglasses D and their pricing information are shown. In the interface 1120 of FIG. 11C, the product Sunglasses E and its product information are shown. In each of the interface screenshots of FIGS. 11A-11C, the interfaces 1100, 1110 and 1120 provide options for a user to "try out" the products(s) as shown with reference to 1102, 1112 and 1122 (e.g., TRY IT ON or Camera Icon). The user can also initiate a transaction to purchase a product, such as by adding the desired product to the cart and then checking out. Further, the user can scroll or browse through the various products through user input.

Figure 12B:
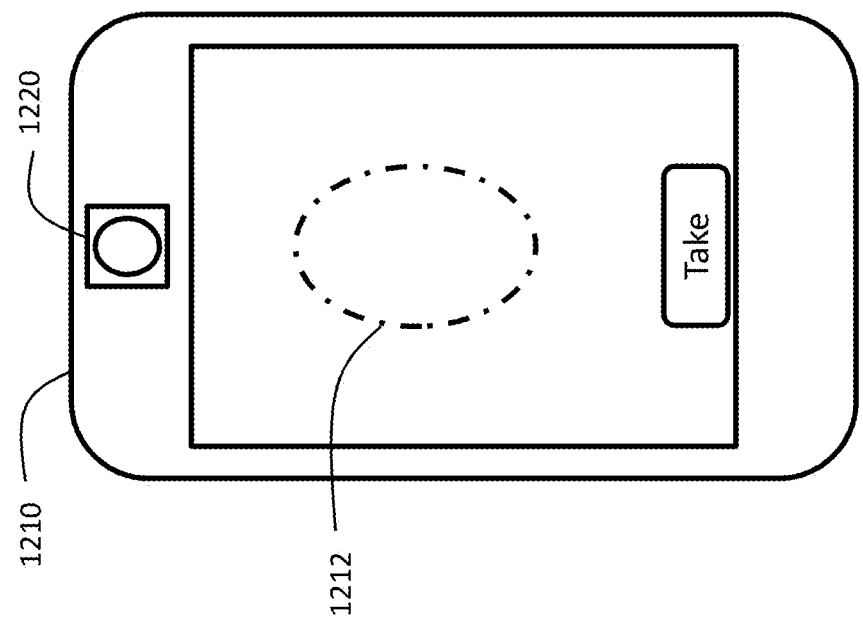
FIGS. 12A and 12B are screenshots of exemplary interfaces through which a user is provided with an outline to assist the user with camera orientation when taking video or picture in accordance with a disclosed embodiment.
Figure 12A:
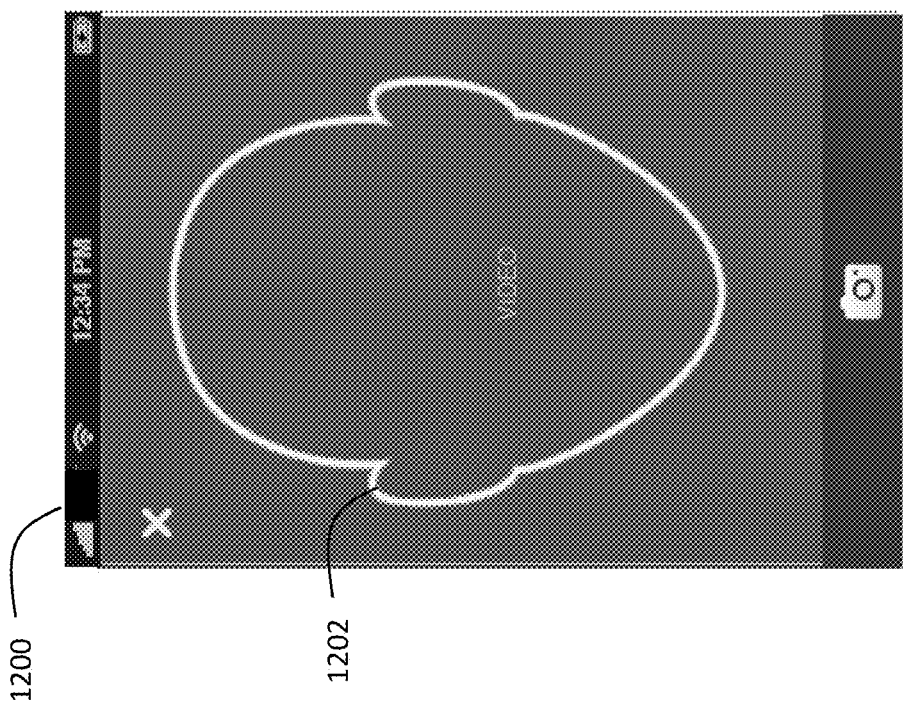

FIGS. 12A and 12B are screenshots of exemplary interfaces 1200 and 1210, respectively, through which a user is provided with an outline to assist the user with camera orientation when taking video or a photo in accordance with a disclosed embodiment. In interface 1200 of FIG. 12A, the user is provided with a facial outline 1202. In interface 1210 of FIG. 12B, the user is provided with an oval outline 1212. The outline can be configured in size and/or shape according to the object or the product. Furthermore, a front facing image capture device 1220 (e.g., a video camera) is shown. In both examples, a video frame feed is displayed on the interface 1212, and the outline provides a user with a frame of reference to orient the camera in a proper direction when capturing an image of an object, such as a person or his or her face and torso. The user is also able to capture and store a specific frame from the video feed.

FIGS. 13A, 13B, 13C, 13D and 13E are screenshots of exemplary interfaces 1300, 1310, 1320 and 1330, respectively, through which a user(s) is trying out a product in accordance with various embodiments. In these examples, the products are sunglasses. As shown in the interface 1300 of FIG. 13A, a product image 1304 of a sunglasses product is overlaid on an object image 1302, e.g., a video frame of an object of a person. The position of the product image is automatically re-positioned with the capture of each successive video frame, in this case, a live video feed. The user can snap a photo of a particular overlaid image at any time through the user device. As discussed herein, the photo of the overlaid image can be stored, sent to a remote destination or uploaded for use on a social media site. The user can re-take a photo of an overlaid image of a product image on an object image, (e.g., RETAKE 1322) or can edit the images (e.g., EDIT 1324) as shown in the interface 1320 of FIG. 13C.

Figures 13A, 13B:
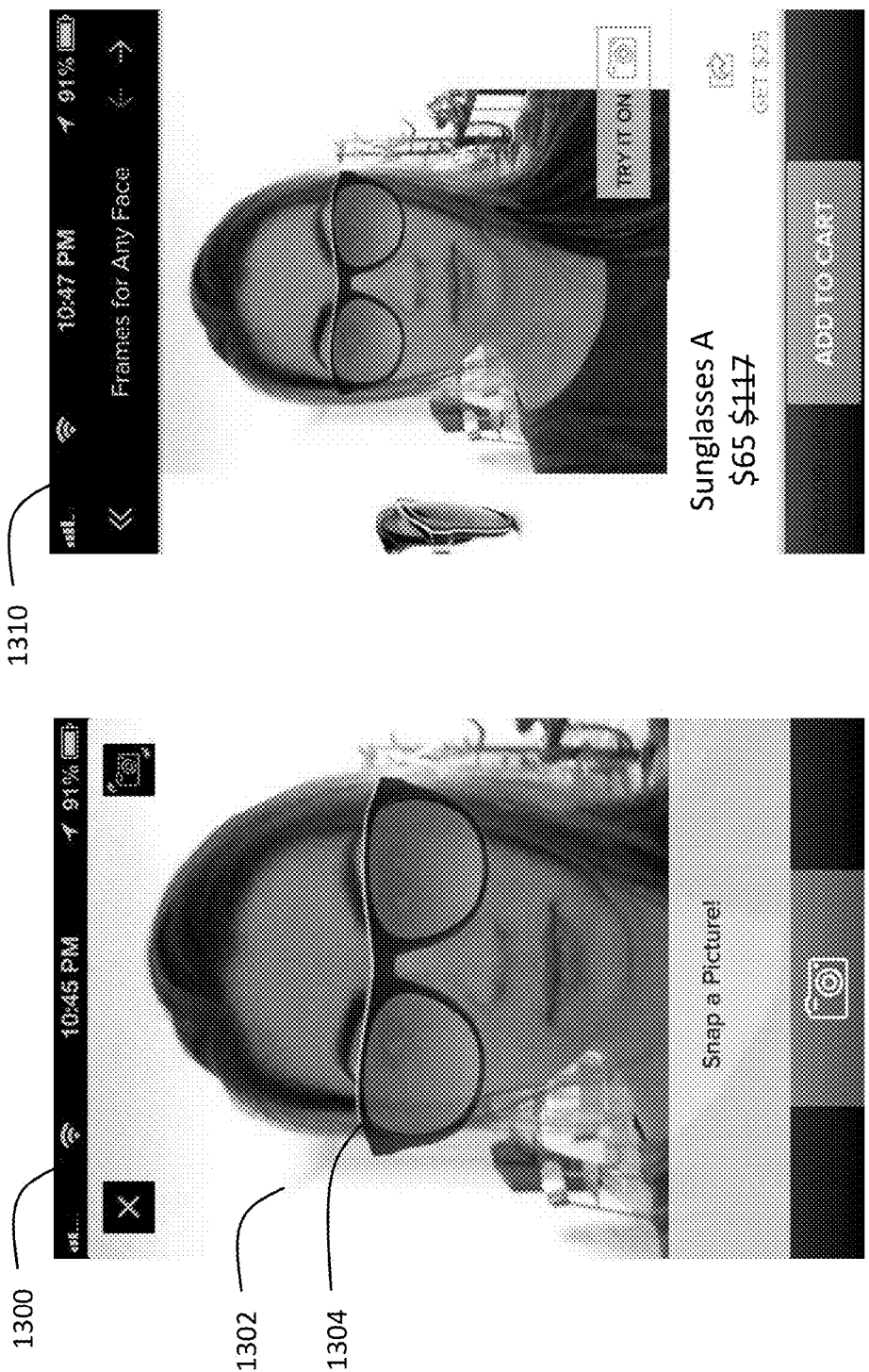
FIGS. 13A, 13B, 13C, 13D and 13E are screenshots of exemplary interfaces through which a user is trying out a product in accordance with various embodiments.

As further shown in the interface 1310 of FIG. 13B, the overlaid image associated with a sunglasses product is stored in relations with other product image viewpoints of that product. Accordingly, when browsing product information, the user can view the available product image(s) (e.g., a front image of the product, a side image of the product, etc.), product detail information as well as the user's overlaid image of the product. Further, after trying out the product, the user can add the product to an online cart, check out and complete a purchase transaction through the product transaction system.

Figure 13D:
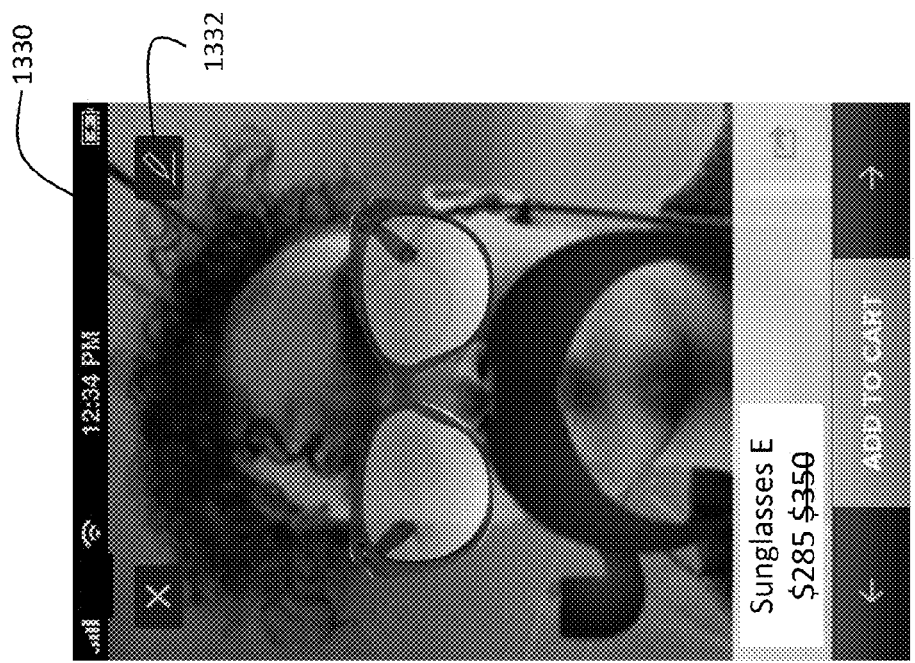
Figure 13C:
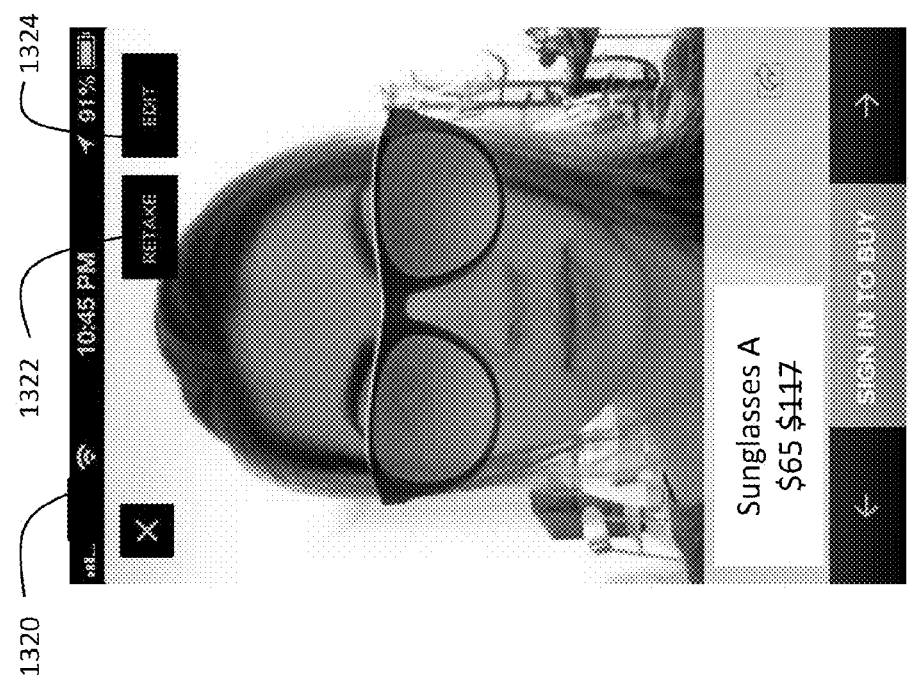

Furthermore, the interface 1330 of FIG. 13D shows an overlay operation with a different object such as a different person. In this example, the user is provided with a drawing or insertion tool 1332, which allows the user to draw or add images on the overlaid image of a product image on an object image. For instance, a moustache and pipe is drawn or added on the overlaid image. This and other augmentations may be implemented on an object image of a real world environment, through augmented reality (AR) techniques.

Figure 13E:

In addition, in a further embodiment, an interface 1340 of FIG. 13E shows multiple try outs of a product(s) within the same object image. In this example, the object image includes images of two people, whose facial features are each detected and overlaid with the sunglasses product image. This overlaid image can also include the company name and product identifier(s). Accordingly, in view of this embodiment, multiple try outs of the same or different products, in the same or different product categories, can also be performed on the same object image. For example, with respect to FIG. 13E, other products (not shown) such as a necklace, a hat and so forth can be tried out on one or both of two people in the object image.

Figures 14A, 14B:
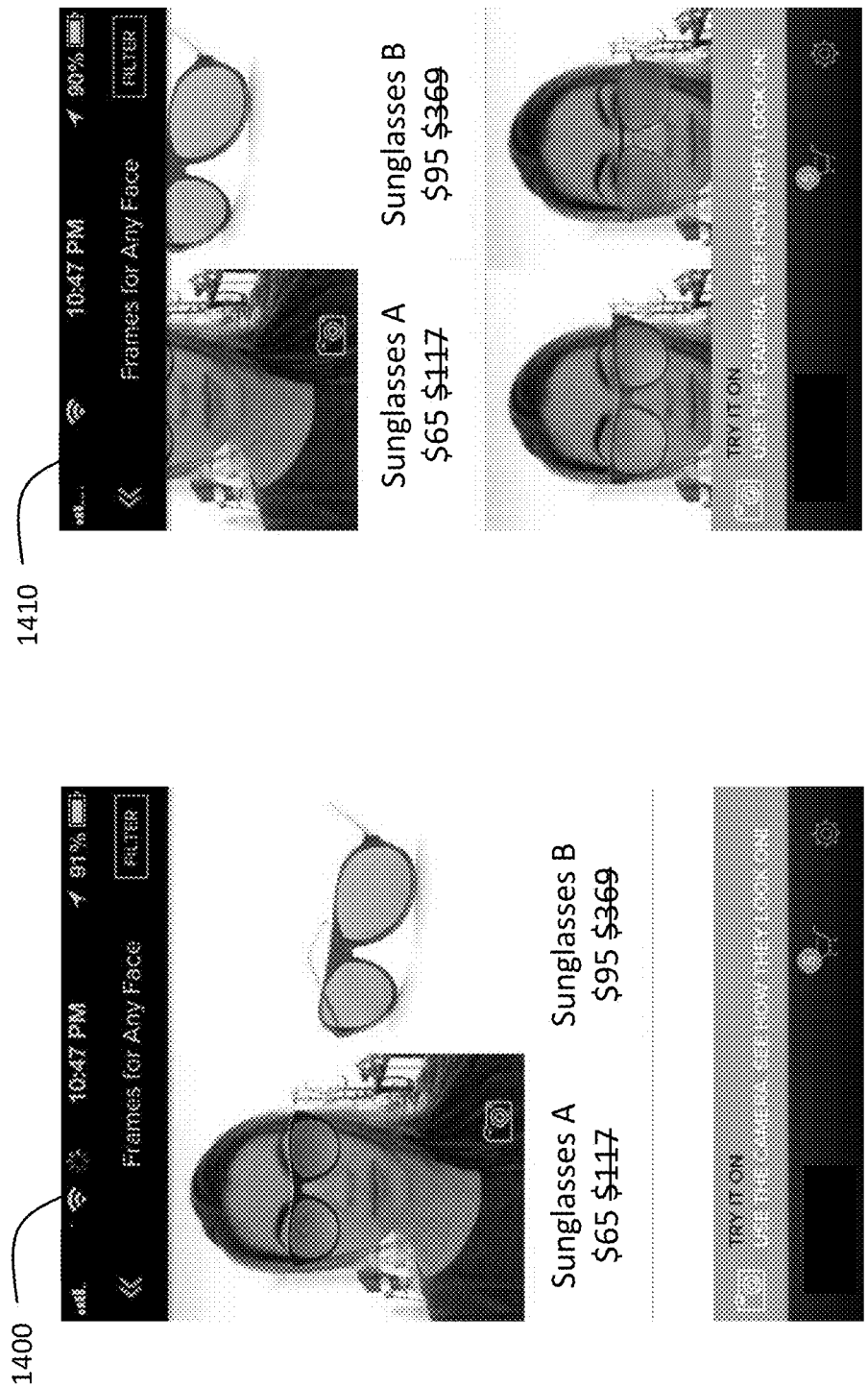
FIGS. 14A and 14B are screenshots of exemplary interfaces through which a user is trying out one or more products in accordance with various embodiments.

FIGS. 14A and 14B are screenshots of exemplary interfaces 1400 and 1410, respectively, through which a user is trying out one or more products in accordance with various embodiments. As shown in the interface 1400 of FIG. 14A, a product listing of several sunglasses products, such as Sunglasses A and Sunglasses B, is displayed including their product image and product information. In this example, the user is trying out a product "Sunglasses A", and an overlaid image is displayed of the product image of Sunglasses A on the object image of a person.

As further shown in the interface 1410 of FIG. 14B, even more sunglasses products are listed, and several of the listed products are being tried out by the user, as shown by an overlaid image of the product image of Sunglasses A on the object image of a person. As discussed herein, the user device can implement a "try out" operation for a single, multiple or all products in a product listing, such as based on a user input. For example, the user device through its sensors can recognize various forms of user input, including gestures such as a shake gesture, to initiate the overlay operations for a single, multiple or all products in the product listing. In an exemplary embodiment, the longer or harder the user performs the shaking gesture, the more products are tried out, with the overlaid images of the products being displayed until all products on the product list have been tried out and displayed as overlaid images. In the interface 1410 of FIG. 14B, there are at least three products that have been tried out, and some products such as Sunglasses B have not been tried out yet. The user can continue to implement a shaking gesture so that all products, including Sunglasses B, are eventually tried out by the user, through the generation of an overlaid image.

Figure 15B:
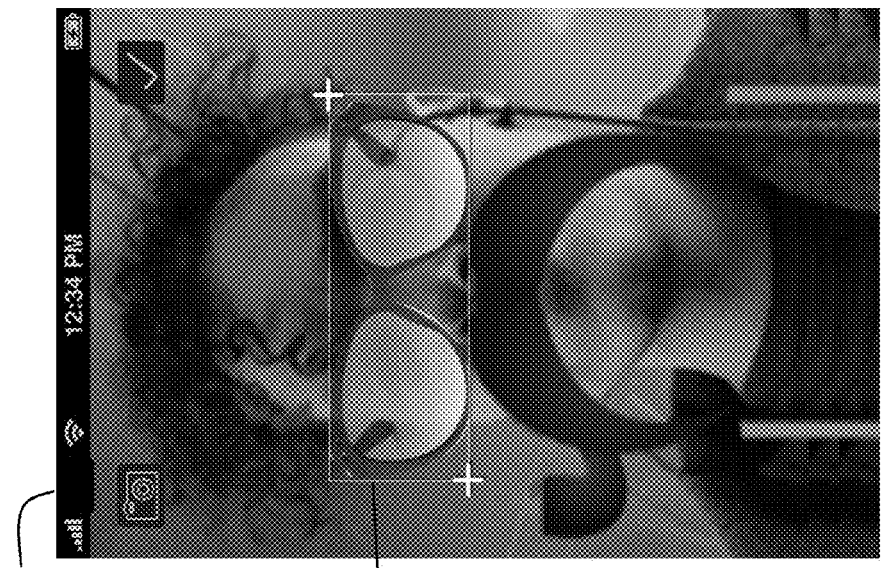
FIGS. 15A and 15B are screenshots of exemplary interfaces through which a user can adjust different aspects of a product image on the object image in accordance with various embodiments.
Figure 15A:
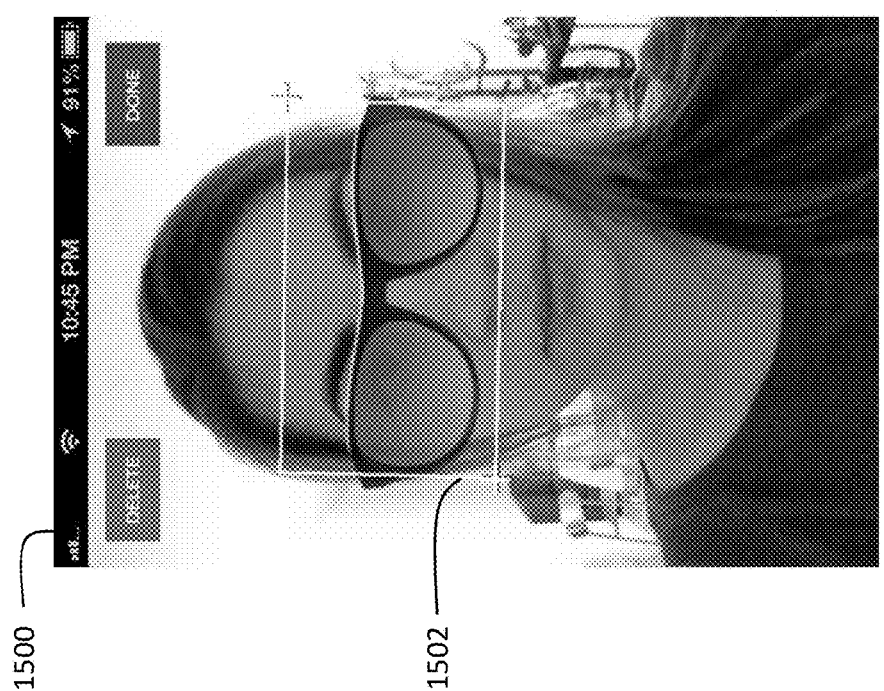

FIGS. 15A and 15B are screenshots of exemplary interfaces 1500 and 1510, respectively, through which a user can adjust different aspects of a product image on the object image in accordance with various embodiments. In these examples, the products are sunglasses. As shown in both interface 1500 of FIG. 15A and interface 1510 of FIG. 15B, the product image can be adjusted, changed or modified on the object image. For example, boundaries (e.g., rectangle bounds) 1502 and 1512 of the product images are displayed on the respective object images. The user can manipulate, by touch command, the boundaries in order to reduce or enlarge the product image, to increase or decrease a height or width of the product image on the object image, or to move the product image to a new position on the object image. Thereafter, the overlaid image with the modified product image can be deleted (e.g., DELETE command) or accepted and saved (e.g., DONE command) as shown in the interface 1500 of FIG. 15A. The user can employ other forms of user input than touch-based commands to modify the product image. For example, graphical boxes can be used to allow a user to input numerical parameters of size, height and/or width to modify the product image.

Figure 15C:
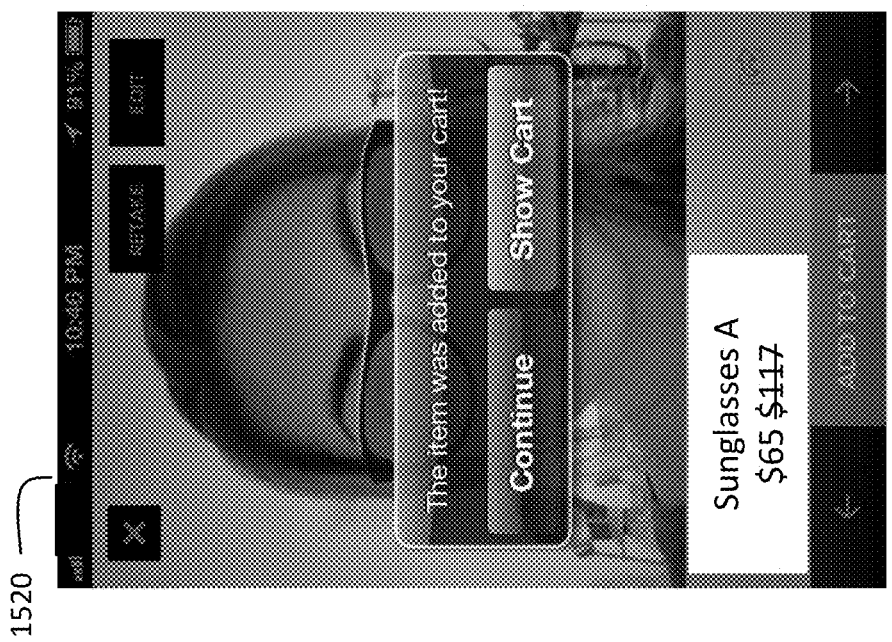
FIG. 15C is a screenshot of an exemplary interface through which a user adds a product to the cart as part of product transaction in accordance with an embodiment.

FIG. 15C is a screenshot of exemplary interface 1520 through which a user has added a product, which has been tried out, to the online cart in accordance with an embodiment. In this example, the user has tried out the product "Sunglasses A", and has decided to add this product to the cart. The user can continue to browse products (e.g., CONTINUE command) or can request a showing of the items in the cart (e.g., SHOW CART command).

Figure 16B:
Figure 16A:
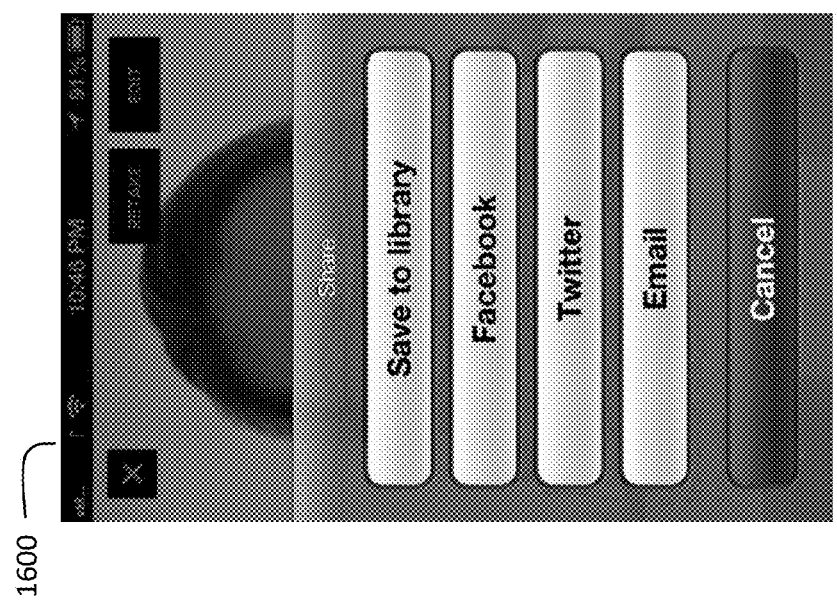

FIGS. 16A, 16B and 16C are screenshots of exemplary interface 1600, exemplary overlaid image 1610 and exemplary interface 1600, respectively, through which a user is provided with different options after trying out a product in accordance with various embodiments. In these examples, the products are sunglasses, and the object is a person. As shown in FIG. 16A, the user interface 1600 provides the user with a number of sharing options in relations to an overlaid image of a product image on an object image, an example of the overlaid image is shown in FIG. 16B. The image 1610 in FIG. 16B includes the overlaid image along with product information of the product, such as a Source Identifier and Product Identifier (e.g., Product Name, Brand, etc.).

The exemplary sharing options, as shown in the interface 1600 of FIG. 16A, include saving the overlaid image (e.g., SAVE TO LIBRARY), uploading the overlaid image to a remote destination including a social media site (e.g., FACEBOOK, TWITTER, etc.), or sending the overlaid image to a remote destination (e.g., EMAIL), or canceling or exiting the sharing options (e.g., CANCEL). FIG. 16C shows an exemplary interface 1620, in which the sharing options and the overlaid image and product information (e.g., Source Identifier and Product Identifier) are laid out for display in a different format, in accordance with another embodiment.

Figure 18:
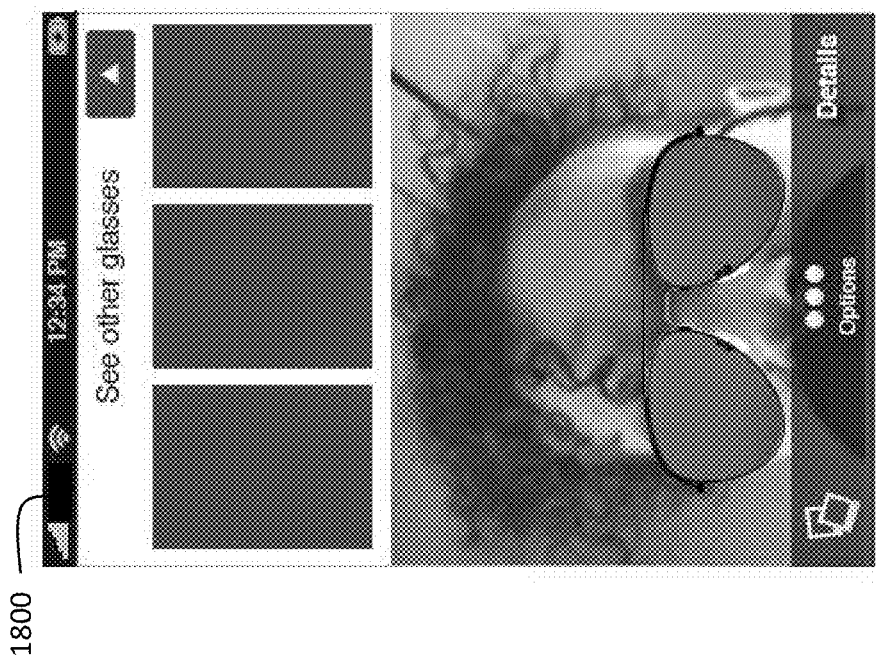
FIG. 18 is a screenshot of an exemplary interface through which is provided options to try out other products in accordance with an embodiment.
Figure 17:
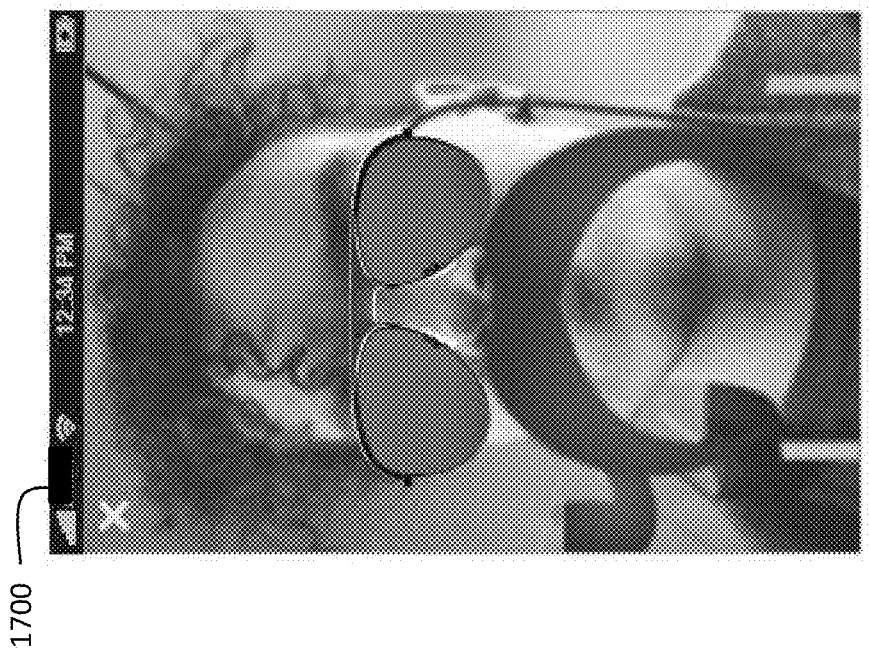
FIG. 17 is screenshot of exemplary interface through which a user is trying out a product in accordance with an embodiment.

FIG. 17 is screenshot of an exemplary interface 1700 through which a user is trying out a product in accordance with an embodiment. In this example, in the overlaid image, the product image of the sunglasses has lenses whose pixels are opaque rather than transparent. As further shown in FIG. 18, a user interface 1800 displays the overlaid image of FIG. 17, and provides the user, through a pull down graphical box, with options to view and try out other products, e.g., other sunglasses. The user is also provided with other user commands (e.g., DETAILS for showing product details, OPTIONS for sharing or other options, and the bottom left icon representing SAVE).

Figures 19A, 19B, 19C:
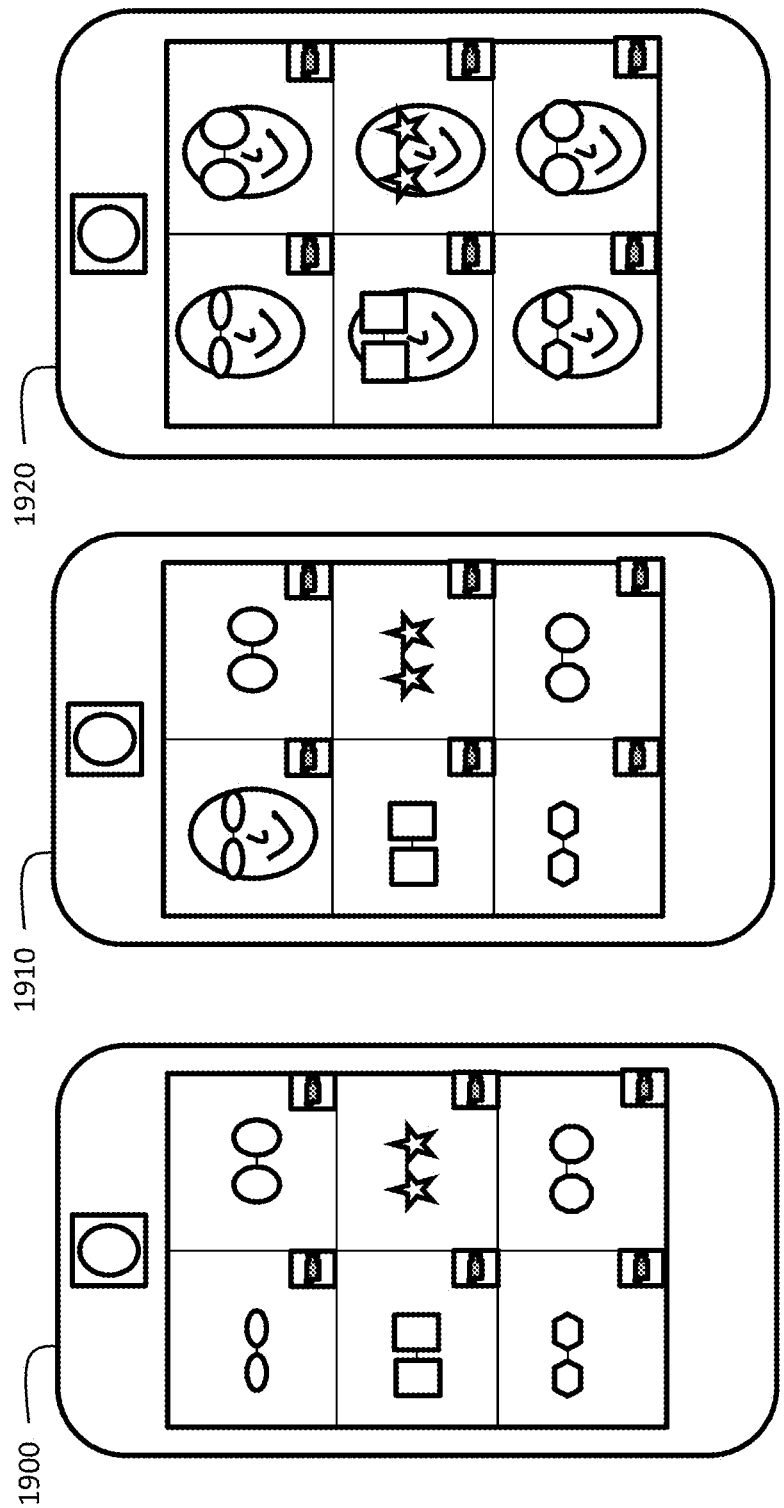
FIGS. 19A, 19B and 19C are screenshots of exemplary interfaces through which a user can try out one or more or all products displayed in a product listing in accordance with various embodiments.

FIGS. 19A, 19B and 19C are screenshots of exemplary interfaces 1910, 1920 and 1930, respectively, through which a user can try out one or more or all products displayed in a product listing in accordance with various embodiments. In this example, the products are sunglasses, and the object is a person. FIG. 19A shows an exemplary product listing, in this example, a listing of sunglasses, and an option to try out one or more of the product(s). FIG. 19B shows that one of the products has been tried out. FIG. 19C shows that multiple products, for example, all of the products, have been tried out. As discussed herein, one, more or all of the products can be selectively tried out through a user input, such as a shaking gesture. For example, the stronger or longer the shaking gesture, the more products in the product listing are tried out, with a display of the product image of a product on the object image. The order in which a product is tried out can be implemented sequentially through the product list or randomly. In the case of a single product, a default overlay position for the product category (e.g., eyewear) can be stored beforehand based on a prior use of the 'try out" feature, discussed herein, on a product in the same or general category or subcategory.

FIGS. 20A, 20B and 20C are screenshots of exemplary interfaces 2000, 2010 and 2020, respectively, through which a user can try out other recommended products in accordance with various embodiments. In these examples, the products are sunglasses, and the object is a person. As shown in FIG. 20A, the interface 2000 displays an overlaid image of a product image of sunglasses on an object image of a person, and product information including the product identifier and restricted conditions of the offer (e.g., time left and quantity left in the offer for sale of the product). The interface 2000 also includes an option 2002 to add the product to an online cart, and an option 2004 to obtain a recommendation of other products. The user device can provide a recommendation for other products that are also available for sale under unrestricted or restricted conditions. The recommendation may be performed by a recommendation engine, implemented on the user device or the product transaction system, which evaluates various factors to filter and ascertain a subset of other products of interest to the user from a plurality of products. These factors may include: (1) the current product selected or tried out by the user, including the product's brand, price point, category (e.g., eyewear), or characteristics such as color(s) and style (e.g., generic, retro, preppy, etc.), other products that may match well with the product, and other information about the product; (2) the user's behavior or tastes, such as the user's preferences (e.g., preferred brands/designers, preferred color(s), preferred style(s) and preferred price range(s)), the user's product transaction or browsing history, products owned by the user, and other indicators of the user's shopping behavior; (3) a plurality of products, which are searchable, such as other products currently available or available in upcoming sales under unrestricted or restricted conditions; and/or (4) other factors which can help determine a user's interests in products and shopping behavior. Some or all of this information can be maintained or accessed from the user's profile data (see e.g., FIG. 25) and/or the product data (see e.g., FIG. 26).

As shown in FIG. 20B, the interface 2010 displays a selection of recommended products 2012. In this example, the recommended products are hats. The user can further try out these recommended products as shown in FIG. 20C. For example, in the interface 2020 of FIG. 20C, the overlaid image with the sunglasses product is further overlaid with a product image of one of the recommended hat products, and displayed along with product information. The user can add the hat product to the online cart, or request additional product recommendations, such as for other products. In the context of this example, the other recommended products may include other wearable items, which may match the selected sunglasses and hat and/or the user's tastes or needs based on the user's profile data and/or the product data. This further overlaid image can also be stored, saved, sent or uploaded to a desired destination.

FIGS. 21A and 21B are screenshots of exemplary interfaces 2100 and 2110, respectively, through which a user can try out a product at different viewpoints in accordance with various embodiments. As shown in FIG. 21A, the overlaid product image of the sunglasses is a frontal viewpoint in light of the position of the facial features in the object image of a person. As the person moves, the position of the facial feature in subsequent captured object images (e.g., subsequent video frames) changes. Thus, an appropriate product image viewpoint and overlay position is determined in light of these changes, and a product image associated with the determined viewpoint is overlaid accordingly on the current object image, such as shown in FIG. 21B. In FIG. 21B, the person's head has turned to one side, and the product image with a side viewpoint is overlaid on the facial feature of the object image. The viewpoint of the product image can be selected based on a position of other features in the boundary of a primary feature. For example, a viewpoint of a product image can be selected based on a position of an ear and/or an eye and/or nose and/or mouth in relations to the facial boundary and to each other.

Figure 27B:
FIGS. 27A and 27B are an exemplary product image of a bracelet taken at a viewpoint and an exemplary screenshot of a user trying out the bracelet, respectively, in accordance with an embodiment.
Figure 27A:
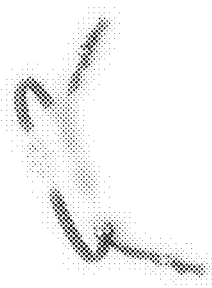
Figure 28B:
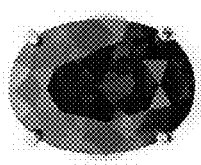
FIGS. 28A and 28B show product images of a product, e.g., a ring, taken at different viewpoints in accordance with an embodiment.
Figure 28A:
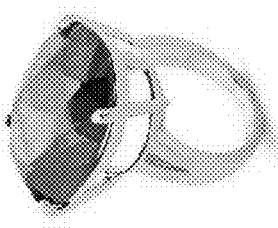

The above screenshots describe exemplary implementations of the methods and processes related to the try out feature discussed in this disclosure. Although the try out operations have been discussed above with reference to eyewear products, other products may be tried out using the method and system discussed herein. For example, accessories such as bracelets (e.g., as shown in FIGS. 27A and 27B) or rings (e.g., as shown in FIGS. 28A and 28B), through their product images, can also be tried out on an object image of a person's hand. Furthermore, although certain operations have been described as being implemented by the user device, any number of the operations may be implemented on the server side by the product transaction system or implemented in a distributed manner between the client and server side.

D. Databases

The following are a few exemplary databases for storing and maintaining product and user information, such as product data and user profile data, in accordance with various embodiments.

FIG. 25 is an exemplary profile data 2500 for a user (or "user profile data") in accordance with an embodiment. As shown in the example of FIG. 25, the user profile data includes User Information, User Images, User Preferences, History and Product Images. The User Information includes User Name, User Contact Information and User Account Information.

The User Images includes one or more user images of objects, which can be used when trying out a product. A user's object image may be an image of a real world object (e.g., a person or a thing), and may be a current or past image of an object for which a "try out" operation has occurred, or not. In one example, the user image is of a person, particularly a face of the person, which was used to try out a sunglasses product. Various data is stored along with the user's object image, such as overlay parameters, e.g., a position parameter and a viewpoint parameter, which was previously determined or used in conjunction with trying out a sunglasses product. A position parameter identifies a point or region on the user's object image to overlay a product image, and the viewpoint parameter identifies the viewpoint of the product image to be used (e.g., front view of the product image, the left-side view of product image, the X-Y view of product image, the X-Y-Z view of the product image, etc.). The viewpoint may be defined by two-dimensional space or three-dimensional space. These overlay parameters can be used as default overlay parameters when the user image is used in future or subsequent "try out" operations of other products in the same category (e.g., sunglasses category) or similar categories (e.g., eyewear, glasses, etc.). In another example, the user image is of a living room and may be used to "try out" products in the home goods or furniture category, such as a chair, painting and so forth.

The user preferences include preferred brands or designers, preferred color(s), preferred style(s), preferred price range(s) and other user preferences for products. The user preferences may be defined for each product category or product sub-category. For example, the user prefers Brands A and B for shoes. The user may also prefer a particular color (e.g., red) for sunglasses products, a particular style (e.g., contemporary) for furniture products, and a particular price range (e.g., expensive) for shoe products.

The history includes a product transaction history and a product browsing history. The product transaction history can include information on products that have been purchased in the past by the user. This information can include a date of purchase of a product and the product information. The product browsing history can include information on products that the user has viewed in the past.

The product images include images of products that the user owns or has purchased. For example, the user owns a product Sunglasses 1. For this product, there is stored a product image(s) and product detail information such as brand/designer, price range and color and any other product characteristics. The product image(s) and product detail information may come from the user's prior try out operations and purchase of the product.

FIG. 26 is an exemplary product data 2600 for one or more products (e.g., Product A through Product . . . ZZ) in accordance with a disclosed embodiment. The product data 2600 can be used when offering the one or more products for sale or when recommending a product to a user.

As shown in FIG. 26, the product data of each product can include a category and subcategory of the product, image data, product detail, pricing information, offer conditions and other product information. The image data includes product image(s) and data associated therewith, including images of the product from different viewpoints, image metadata, image-capture parameters and other tagged or associated information (e.g., the product detail information). The product detail includes a product identifier, source (brand/designer), color(s), style(s) and other matching products/brands. The other matching products/brands identify other products or brands of products that may match well or be used together with the particular product. For example, a hat from Brand X or a scarf from Brand Y is known to be a good match with the sunglasses of Product A.

The pricing information includes any information about the price and pricing of the product, such as a retail price, a discount price and a discount percentage. The offer conditions define the conditions under which the product is offered for sale, and can be restricted or unrestricted. In this example, the offer conditions include restricted and unrestricted conditions. The restricted conditions may limit a sale of the product to particular date and/or time, to a particular quantity, and/or to a particular user group.

Exemplary "Try Out" Scenario

An example of a "try out" scenario is provided for the purposes of explanation. For example, a user is informed of an online sale of certain products, in this case, eyewear (e.g., sunglasses of brand N). The sale is a flash sale, which in this example is limited by time and/or by quantity, and is likely to end quickly. For example, the sale of these sunglasses products is likely to end in an hour, due to high demand for the products at the discounted price. The user is notified of the sale through the user device, e.g., smartphone, as she is walking to work, but is unable to try out the products in person at a B&M store under the circumstances.

The sunglasses are offered for sale online through a product transaction system (e.g., online site or business), which is in communications with the user through the user device. Product detail information is provided for each sunglasses product, as well as an option to try out these products through the user device. The user can select one of the products, obtain a user image (e.g., take live video or access stored image of the user), and try out the products electronically. For example, the user device, independently or in combination with the product transaction system, overlays and displays an image of the selected product on the user image. If the user image is from a live video feed, the position and/or viewpoint of the product image is adjusted in real-time for each video frame (e.g., each object image). At any time, the user can take a "snap-shot" of an overlaid image of a product image on a captured video frame, and store, send or upload it to a destination. The user can also adjust or edit the product image on the object image of the overlaid image, or retake another "snap-shot" of an overlaid image. After trying out the selected product through the user device, the user can purchase the product, try out the product along with other products (e.g., those already owned by the user), request a recommendation for other products, or forward the overlaid image to one or more friends to ascertain their opinion on the product.

Accordingly, the method and system described in this disclosure can provide consumers with the ability to make an informed purchase decision, even when they are unable to try out or sample the product in person or are subject to time constraints.

E. Exemplary Components

Figure 22:
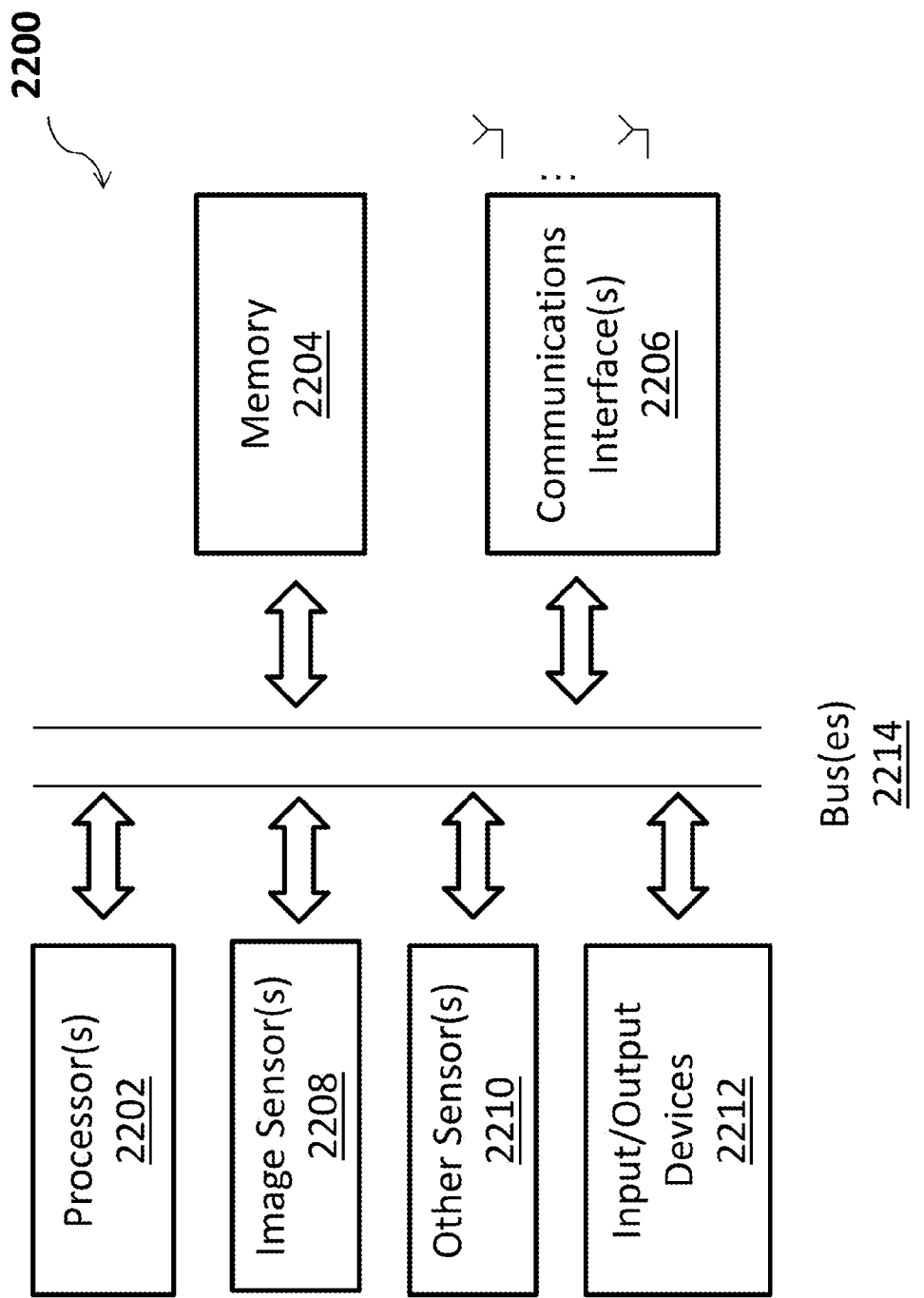
FIG. 22 is a block diagram of exemplary components of a user device or computer system in accordance with an embodiment.

FIG. 22 illustrates a block diagram of exemplary components of a user device 2200, such as in FIG. 1 (e.g., 110 and 116), in accordance with a disclosed embodiment. The device 2200 includes processor(s) (or controllers) 2202, memory 2204, communications interface(s) 2206, image sensor(s) 2208, other sensor(s) 2210, input/output device(s) 2212, and bus(es) 2214 for interconnecting components of the device.

The memory 2204 can be a non-transitory computer-readable storage medium used to store executable instructions (or codes) or computer programs thereon or to store other data. The memory 2204 may include a read-only memory (ROM), random access memory (RAM), programmable read-only memory (PROM), erasable programmable read-only memory (EPROM), a hard drive, a solid state drive, secure digital (SD) or micro SD card, a smart card, a subscriber identity module (SIM), or any other medium from which a computing device can read executable instructions or a computer program or data. The term "computer program" is intended to encompass an executable program (or codes) that exists permanently or temporarily on any computer-readable storage medium as described above.

The computer program also includes an algorithm that includes executable instructions stored in the memory 2204 that are executable by the processor(s) 2202, which may be facilitated by one or more of the application programs also stored on the memory 2204. The application programs may also include, but are not limited to, an operating system or any special computer program that manages the relationship between application software and any suitable variety of hardware that helps to make-up a computer system or computing environment of device 2200. For example, the computer program may also include a browser, an email program, and applications (or apps), including mobile and internet apps. One or more of the applications may be for viewing or purchasing products (e.g., goods and/or services) and for enabling a user to try out one or more products in relations to a real world environment, such as through augmentation of reality or augmented reality (AR), as discussed in this disclosure.

The communications interface(s) 2206 include transmit and receive circuitry (or components) for conducting wireless or line-based communications with a network or network node, or other communications-enabled devices. For example, the communications interface(s) can include line-based interface(s), and one or more transmit antennas and one or more receive antennas for conducting wireless communications.

The image sensor(s) includes one or more cameras for capturing still or video images. A camera can be positioned on a front of the user device and/or on the back of the user device.

The other sensor(s) 2210 include a position sensor, touch sensor or touch screen, audio sensor, accelerometer, inclinometer, compass and gyro meter or other device for sensing characteristics, such as the environment of the device or the user. These other sensors (including the image sensors) can be used to ascertain user inputs (or commands), such as user gestures.

The input/output device(s) 2210 may include various input and output devices. For example, the input devices may include a touch input device (e.g., a keyboard, mouse, buttons, switches, touch display or screen, touchpad), audio input (e.g., a microphone), or a device that enables that user to provide information through some other medium. For example, the sensors can be used to sense user input (e.g., user motions or gestures). The output devices may include a visual output device (e.g., a display), an audio output device (e.g., speaker), a vibrational output device or a device that provides information to a user through some other medium.

FIG. 23 illustrates a block diagram of exemplary components of a server 2300, such as in FIG. 1 (e.g., 120 and 130), in accordance with an embodiment. The server 2300 includes processor(s) (or controllers) 2302, memory 2304, communications interface(s) 2306, and bus(es) 2308 for interconnecting components of the network node.

The memory 2304 can be a non-transitory computer-readable storage medium used to store executable instructions (or codes) or computer program or to store other data. The memory 2304 may include a read-only memory (ROM), random access memory (RAM), programmable read-only memory (PROM), erasable programmable read-only memory (EPROM), a smart card, a hard drive, a solid state drive, or any other medium from which a computing device can read executable instructions or a computer program or data. The term "computer program" is intended to encompass an executable program that exists permanently or temporarily on any computer-readable storage medium as described above.

The computer program also includes an algorithm that includes executable instructions stored in the memory 2304 that are executable by the processor(s) 2302, which may be facilitated by one or more of the application programs also stored on the memory 2304. The application programs may also include, but are not limited to, an operating system or any special computer program that manages the relationship between application software and any suitable variety of hardware that helps to make-up a computer system or computing environment of server 2300. For example, the computer program also includes programs and codes to implement the various product transaction and product try out processes, as discussed in this disclosure.

The communications interface(s) 2306 include transmit and receive circuitry (or components) for conducting wireless or line-based communications with a device. For example, the communications interface(s) can include line-based interface(s) such as for conducting communications with other network components, and one or more transmit antennas and one or more receive antennas for conducting wireless communications.

The various apparatus, methods, flow diagrams, and structure block diagrams described in this disclosure may be implemented in a computer processing system including program code comprising program instructions that are executable by the computer processing system. Other implementations may also be used. Further, the flow diagrams and structure block diagrams described in the present disclosure, which describe particular methods and/or corresponding acts in support of steps and corresponding functions in support of disclosed structural means, may also be utilized to implement corresponding software structures and algorithms, and equivalents thereof.

The various exemplary embodiments described in this disclosure can be implemented as one or more computer program products, i.e., one or more modules of computer program instructions encoded on a tangible program carrier for execution by, or to control the operation of, a user device or server. The computer readable medium can be a machine readable storage device, a machine readable storage substrate, a memory device, a composition of matter effecting a machine readable propagated signal, or a combination of one or more of them.

A computer program (also referred to as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by a processing system. For example, one or more programmable processors or digital signal processors (DSPs) can execute one or more computer programs to perform functions by operating on input data and generating output. The processes and logic flows can also be performed by special purpose logic circuitry, e.g., an FPGA (field programmable gate array) or an ASIC (application specific integrated circuit) or CPLD (Complex Programmable Logic Device), or a combination of various processors and special purpose logic circuitry.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks or solid-state drives. However, a computer need not have such devices.

To provide for interaction with a user, the disclosed embodiments can be implemented on a computer or computing device (e.g., user devices 110 and 116 in FIG. 1) having a display device, e.g., a CRT (cathode ray tube) or LCD (liquid crystal display) monitor, for displaying information to the user and a keyboard, touch screen and a pointing device (e.g., a mouse or a trackball) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, motion or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this disclosure contains many exemplary implementations, they should not be construed as limitations on the scope of any invention or of what may be claimed, but rather as descriptions of features that may be specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the disclosed embodiments should not be understood as requiring such separation in all embodiments, and it should be understood that the described program components and systems can generally be integrated together in a single software product or packaged into multiple software products.

The invention claimed is:

1. A computer-implemented method comprising:
   providing electronic information on one or more products offered for sale under restricted conditions of time or quantity;
   obtaining a live video feed of a real image of an object;
   altering a frame rate of the live video feed after obtaining the live video feed thereby creating an altered live video feed;
   determining via one or more processors one or more features from the object image from the altered live video feed after altering the frame rate;
   determining via the one or more processors a position to overlay a first product image on the altered live video feed of the object image based on the determined one or more features, the first product image being an image of a product from the one or more products;
   overlaying via the one or more processors the first product image on the altered live video feed of the object image based on the determined position to provide a video feed of the overlaid image; and
   displaying the video feed of the overlaid image;
   wherein the obtaining, the altering, the determining one or more features, the determining a position, the overlaying and the displaying are performed in real-time on a mobile device.

2. The method according to claim 1, wherein the obtaining comprises capturing live video frames of the object on the mobile device, the object image of the live video feed being a current frame from the captured video frames.

3. The method according to claim 1, further comprising:
   recommending one or more other products, which are available for sale, based on at least one or more characteristics of the product whose product image is overlaid on the object image; and
   overlaying a second product image along with the first product image on the object image, the second product image including an image of the one or more recommended products.

4. The method according to claim 3, wherein the characteristics include a brand name, a color, a size, a product description or a price of the product identified in the first product image.

5. The method according to claim 1, further comprising: adjusting a position or size of the first product image as overlaid on the object image.

6. The method according to claim 1, further comprising: manipulating a background of the determined one or more features in the object image.

7. The method according to claim 1, further comprising: storing the overlaid image of the product image on the object image.

8. The method according to claim 7, wherein the overlaid image is tagged with information including a product identifier and a product category of the product shown in the product image.

9. The method according to claim 1, wherein the one or more products comprises a plurality of different products, the method further comprising:
   overlaying product images of at least two different products in a product listing separately on a separate copy of the object image in response to a user input; and
   displaying the two separate overlaid images at the same time.

10. The method according to claim 9, wherein the user input comprises a shake gesture.

11. The method according to claim 10, wherein one or more products in the product listing have their product image overlaid on a separate copy of the object image and displayed together based on a strength or length of time of the shake gesture.

12. The method according to claim 1, further comprising: conducting a transaction to purchase the product.

13. The method according to claim 1, wherein the object image is an image of a room, the product is a home good, and the first product image is an image of the home good.

14. The method according to claim 1, wherein the object image is an image of a person, the product is eyewear and the first product image is an image of the eyewear.

15. The method according to claim 14, wherein the determining a position operation comprises:
   detecting boundaries of a facial feature of the person in the object image;
   finding a position of a left eye and a right eye of the person in the object image;
   calculating a slope between the left eye and the right eye in the object image;
   calculating an angle of rotation based on the slope between the left eye and the right eye in the object image;
   calculating coordinates of a middle point between the left eye and the right eye in the object image;
   determining a height and a width for the product image within the facial feature while maintaining aspect and ratio;
   adjusting the product image so that a width of the product image is proportional to the boundaries of the facial feature;
   obtaining a y-coordinate to overlay the product image depending on a position of the facial feature in the object image; and
   adjusting the y-coordinate to overlay the product image based on transparent pixels of the product image.

16. The method according to claim 15, further comprising:
   overlaying the product image at the determined position on the object image depending on if the determined position is within a threshold in comparison to a position previously determined for a prior object image, the object image being a currently captured video frame of the object and the prior object image being a prior captured video frame of the object.

17. The method according to claim 1, further comprising: storing the object image and associated positioning and orientation metadata for reuse with other product images.

18. The method according to claim 17, further comprising: overlaying a product image of a product in a different category from that of a product of the first product image on the object image based on the stored object image and associated positioning and orientation metadata.

19. The method according to claim 1, wherein the object image includes two or more objects, the overlaying operation overlaying a first product image over a first of the two objects in the object image and another product image over at least a second of the two or more objects in the object image.

20. The method according to claim 19, wherein the two or more objects comprises two or more people.

21. A mobile device comprising:
   an image capture device;
   memory; and
   one or more processors, coupled to the memory, for:
      providing electronic information on one or more products offered for sale under restricted conditions of time or quantity;
      obtaining a live video feed of a real image of an object from the image capture device;
      altering a frame rate of the live video feed after obtaining the live video feed thereby creating an altered live video feed;
      determining one or more features from the object image from the altered live video feed after altering the frame rate;
      determining a position to overlay a first product image on the altered live video feed of the object image based on the determined one or more features, the first product image being an image of a product from the one or more products;
      overlaying the first product image on the altered live video feed of the object image based on the determined position to provide a video feed of the overlaid image; and
      displaying the video feed of the overlaid image;
   wherein the obtaining, the altering, the determining one or more features, the determining a position, the overlaying and the displaying are performed in real-time on a mobile device.

22. A non-transitory computer readable medium storing executable code, which when executed by one or more processors, implements the computer-implemented method comprising:
   providing electronic information on one or more products offered for sale under restricted conditions of time or quantity;
   obtaining a live video feed of a real image of an object;
   altering a frame rate of the live video feed after obtaining the live video feed thereby creating an altered live video feed;
   determining one or more features from the object image from the altered live video feed after altering the frame rate;
   determining a position to overlay a first product image on the altered live video feed of the object image based on the determined one or more features, the first product image being an image of a product from the one or more products;
   overlaying the first product image on the altered live video feed of the object image based on the determined position to provide a video feed of the overlaid image; and
   displaying the video feed of the overlaid image;
   wherein the obtaining, the altering, the determining one or more features, the determining a position, the overlaying and the displaying are performed in real-time on a mobile device.

23. The method according to claim 2, further comprising:
   snapping a photo of the displayed video feed of the overlaid image on the mobile device; and
   uploading the photo via the mobile device to a social media site.

24. The method according to claim 1, wherein the determining a position automatically determines and updates the position at which to overlay the first product image on the altered live video feed of the object image, the method further comprising:
   manually adjusting the position at which the first product image is overlaid on the object image in the altered live video feed, the manually adjusting causing the determining a position to stop automatic determination of the position temporarily or until a user stops manually adjusting the position.

25. The method according to claim 1, wherein the product image is automatically re-positioned in real-time on the object image of the altered live video feed with capture of each successive video frame of the altered live video feed.

26. The method according to claim 1, wherein the frame rate of the live video feed is altered to accommodate processing time for feature detection in the determining a position and compositing in the overlaying.

* * * * *